INTEGRATED MULTI-COMPUTER SYSTEM

Filed March 19, 1968 3 Sheets-Sheet 1

INVENTOR.
BEVIER HASBROUCK
BY
ATTORNEY

INTEGRATED MULTI-COMPUTER SYSTEM

Filed March 19, 1968 3 Sheets-Sheet 2

INVENTOR
BEVIER HASBROUCK
BY
Morton C. Jacobs
ATTORNEY

INVENTOR.
BEVIER HASBROUCK
BY
Mateon C. Jacobs
ATTORNEY.

United States Patent Office 3,566,358

Patented Feb. 23, 1971

3,566,358

INTEGRATED MULTI-COMPUTER SYSTEM

Bevier Hasbrouck, 314 Lafayette Ave., Swarthmore, Pa. 19081

Filed Mar. 19, 1968, Ser. No. 714,201
Int. Cl. G06f *15/16*
U.S. Cl. 340—172.5 51 Claims

ABSTRACT OF THE DISCLOSURE

A multi-computer system employs a mass cyclic storage, such as a magnetic drum, as the main system memory, and it comprises a plurality of independent computer entities that operate with a common central processor on a time-sharing basis. Each computer entity comprises a small plurality of registers from the random access memory. A content-addressed memory controls the assignment of the central processor to the computer entities and controls the drum transfers of data and instruction signals to and from the computer entities; these transfers are scheduled so that, over each memory cycle, a plurality may be performed with minimal latency. The central processor, upon completing the processing for a particular computer entity, supplies the content-addressed memory with the addresses for the drum transfer and calls for the next computer entity to be processed.

BACKGROUND OF THE INVENTION

This invention relates to digital data processors or computers, and particularly to an integrated multi-computer system.

One of the most important demands placed upon the design of present-day computers is that of providing a system to serve a large number of users. Time-sharing systems that have been devised must interact with numerous communication links and complex input-output devices, such as display consoles. All of these devices make concurrent demands on the same system components and must be served substantially simultaneously in real time, so that all of the users of the time-sharing system can perform their independent or interdependent functions effectively. In such a multi-user computer system, an elaborate control and supervisory system has necessarily been provided. The supervisory system becomes an expensive part of the overall computer system and itself poses a considerable drain of the system computing power, since it must employ the computer system for its own functions. A simple and effective control system for time-sharing computers is needed to provide capability for new applications and wider use of computers.

A major obstacle in providing such time-sharing computer systems is the high cost of high-speed memory; this problem also exists in present-day batch mode computers. Magnetic core memories are presently used for the random-access high-speed memory required in a computer, and its cost is a major fraction of the overall cost of a computer system. For instance, a memory capacity of 10 million bits may be required for a computer system, and at a cost of about 3 cents per bit, the memory portion of the system would amount to about $300,000. Even larger memory capacities are foreseen, so that the total cost becomes extremely great in the context of a large number of such computers (hundreds, and potentially thousands) which are needed by government and other users. Mass storage systems are generally less expensive; these include cyclic memories, such as magnetic drums, magnetic discs, sonic film memories, delay lines. Their cost may be only of the order of 0.1 cent per bit, which is approximately one-thirtieth the cost of a magnetic core memory. Due to the low access speed of such mass memories and latency problems in gaining access to any particular desired portion thereof, such mass memory is limited to use as a secondary storage, and paging and other techniques are employed for transferring large blocks of data between the mass memory and the high-speed random access memory used as the principal memory. Even in such systems, a very large magnetic core storage is customarily used, due to the low speed and latency problems accompanying such mass storage systems.

The programs for computer users have grown in size and complexity to such an extent that the maintenance, documentation and updating of such programs require that they be broken into modules, sub-modules and routines. For effective production and maintenance of computer programs, many aids are required, such as compilers, assemblers, interpreter systems, pictorial systems, mathematical and other routines. In a multi-user system, efficiency demands that such programs and aids be shared effectively among the users. However, the controls in a multi-user system that would suitably enable the users to have efficient and reliable access to such programs and aids are also needed.

It is not possible in a multi-user system for each user to be completely independent, in that common portions of the system must be shared. However, it is desirable for each operator or programmer constituting the user to be presented with as few restraints as possible on his procedures and to be generally unconcerned with the complexity of the computer system and to be able to operate independently of other users. In addition, it is desirable that a multi-user computer system afford facilities for users to communicate with each other and to combine operations for more complex processing.

SUMMARY OF THE INVENTION

Accordingly, it is among the objects of this invention to provide a new and improved integrated multi-computer system.

Another object is to provide a new and improved multi-user computing system which provides substantially independent computing facilities for a large number of users.

Another object is to provide a new and improved time-sharing computer system in which users can communicate with each other and in which allocated facilities to different users can be combined.

Another object is to provide a new and improved time-sharing computer system, which has a high efficiency in the overall processing performed for all of the users.

Another object is to provide a new and improved multi-computer system employing large mass storage having a high overall processing performance and a relatively low cost.

In accordance with one embodiment of this invention, an integrated multi-computer system employs a mass cyclic memory such as a magnetic drum for the main memory. A plurality of independent computer entities or units are provided, each of which may be independently assigned to a particular user of the system. Each computer entity (CE) is in fact an independent general-purpose computer, though it may share the use of some components. It includes a plurality of addressable registers, which may take the form of a relatively small number of words of the high-speed random access memory. A certain number of these computer-entity registers are pre-assigned for the storage of program instructions and for certain housekeeping operations, and the remaining larger number of registers may be freely used by the user for storing operands and other data as the user desires. The computer entities share a common central processor which operates on a time-sharing basis to perform the required processing for each computer entity. A control system is provided for scheduling transfers of data and instructions between the drum and the computer-entity registers. A content-addressed, or associative, memory (CAM) is used for storing all requests from the computer entities for drum transfers and for organizing these requests in a queue for efficiently scheduling the transfers to take place over each drum cycle. CAM is supplied with the drum and register addresses between which the transfer is to take place, as well as the amount of information to be transferred and the direction of the transfer. CAM also receives the angular position of the drum repeatedly during its cycle and searches among the drum addresses requested by the computer entities and selects therefrom the next transfer to be performed. It also resolves any conflicts for similar demands. By scheduling the drum accesses to satisfy a large percentage of the requests over each drum cycle, a high overall efficiency of drum transfer is effectuated, and the queuing delays that stem from the latency limitations of the drum are minimized.

The processor operates with one CE at a time to perform the processing called for by the instructions and on the operands stored in the registers of that CE. When a drum transfer is called for by the program of the CE, the processor generates the control word required therefor and supplies it to CAM and teminates its operation with that particular CE. The CAM also works as a control to assign successively to the processor those CE's that are waiting for processing.

A certain portion of the drum is dedicated to each CE, and thereby to the user thereof. This provides each user with as much storage as is desired for his own use, together with a major segment of the drum which is devoted to common programs, data, and aids to which each user may have access. Thereby, a large amount of inexpensive memory is furnished to each computer entity, and this memory is used efficiently in that a plurality of memory transfers for the different computer entities are performable over each storage cycle to provide a high overall efficiency in access. The processor is maintained in an active state successively serving the various computer entities as they require.

BRIEF DESCRIPTION OF THE DRAWING

The foregoing and other objects of this invention, the features thereof, as well as the invention itself, may be more fully understood from the following description when read together with the accompanying drawing, in which.

In the drawing, corresponding parts are referenced throughout by similar numerals.

DESCRIPTION OF A PREFERRED EMBODIMENT

TABLE OF CONTENTS

| | Col. |
|---|---|
| OVERALL SYSTEM | 4 |
| SYSTEM THROUGHPUT AND EFFICIENCY | 6 |
| COMPUTER ENTITY REGISTERS | 10 |
| PROCESSOR | 11 |
| CONTROL WORD GENERATION | 12 |
| CAM | 14 |
| CAM OPERATION FOR DRUM TRANSFERS | 18 |
| INSTRUCTION FORMAT AND OPERATION | 20 |
| MEMORY PROTECTION | 23 |
| RELATION, SIZE AND EFFICIENCY OF MAIN AND WORKING MEMORY | 24 |
| ANALYSIS OF SYSTEM THROUGHPUT | 25 |
| VARIATIONS OF RANDOM-ACCESS MEMORY | 26 |
| INTERCOMMUNICATION-INTERLOCKS | 29 |
| INTERCOMMUNICATION-GANG CONTROL | 30 |
| CONSOLE CONTROL | 32 |

OVERALL SYSTEM

Figure 1:
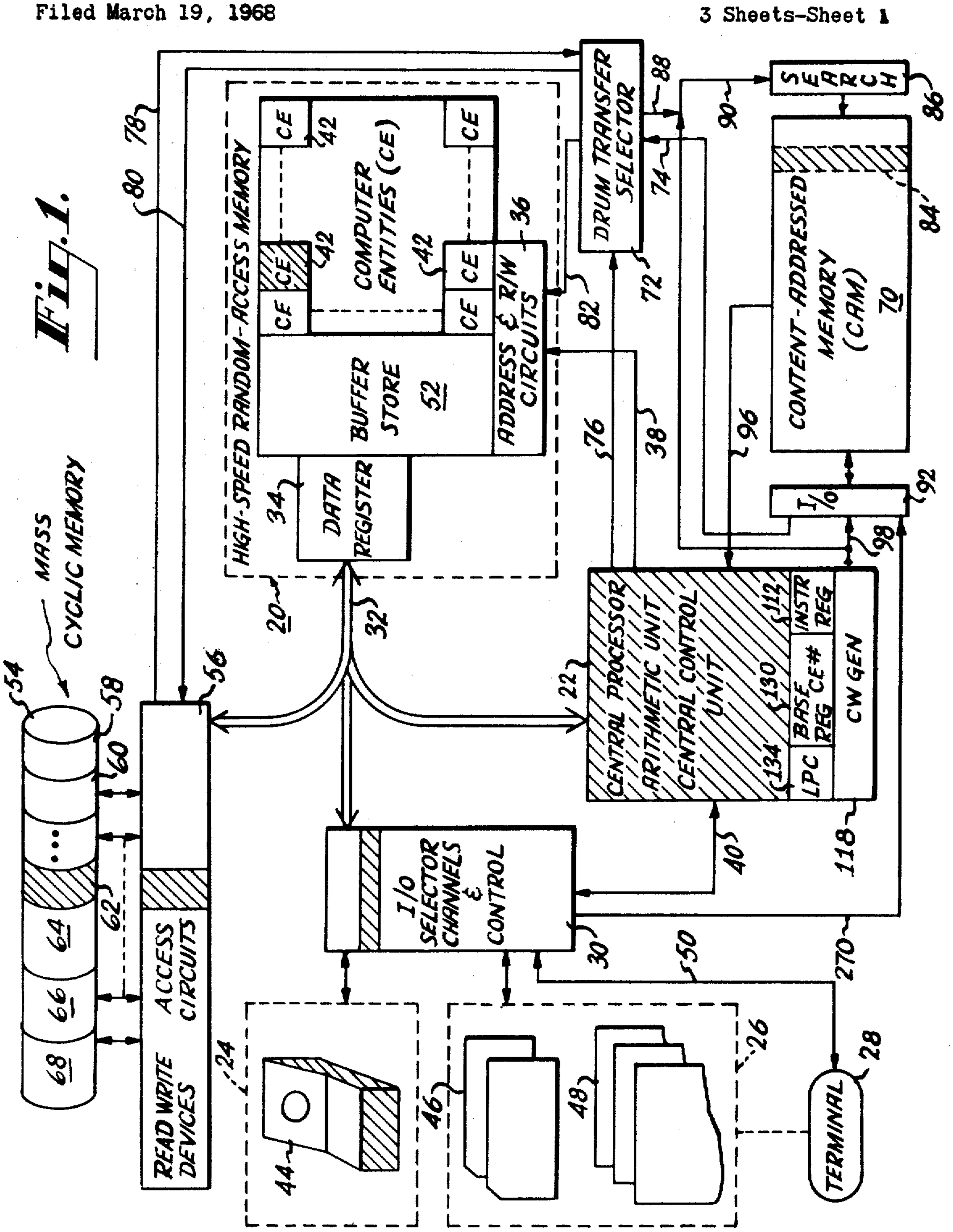
FIG. 1 is a schematic block diagram of an integrated multi-computer system embodying this invention.

In the general system diagram of FIG. 1, a general-purpose, stored-program digital computer or data processor is illustrated, which is made up of the generally conventional parts of a high-speed random access memory 20, a central processor 22 that includes an arithmetic unit and a central control unit, and input and output terminals 24, 26 and 28 that are connected via input-output channels and controls 30 to the word signal bus 32 which interconnects the memory 20 and processor 22. The high-speed memory 20 may be of any suitable type, such as the conventional magnetic core memory, and it includes a data interface and register 34 which receives signals to be stored from the bus and supplies thereto signals that are read out from the memory. Interface circuits 36 for addressing the memory and controlling the read or write operations thereof receive the address and read-write control signals from the processor 22, as indicated by the control line 38; and the processor also controls the input-output operations via the channels 30 as indicated by the control line 40. The general operation and use of such a stored-program computer as described thus far is well known in the art.

In the system of this invention, the memory 20 is divided into two major sections, one of which is divided into a plurality of computer entities or modules (CE) 42, and each such CE is formed of a plurality of consecutively-addressed word registers of the memory. By way of illustration (FIG. 2), each CE 42 may include 64 words of memory, and 128 CE's may be provided, which would take about 8,000 words of high-speed memory, where a word (e.g., 36 bits) is formed as a combination of signals in binary or other suitable notation and divided in fields or characters in accordance with any desired coding system. To assist in the explanation of this invention, a particular quantitative embodiment is described, but it should be understood that there is no specific quantitative limitation on the invention, and various sizes and forms of component parts of the system may be used. Each CE is associated with a separate one of the terminals 24, 26, 28, and each of the latter may take various forms, such as a console 44 for both input and output, and a card reader 46 and page printer 48. The input-output terminals may be connected by direct wire to the input channels 30, or via appropriate communication lines 50. The remaining portion 52 of the memory 20 is used for buffer storage for input-output operations and for any other desired function. This buffer section 52 may be half of the overall memory 20. For convenience in addressing in the illustrative embodiment, a 14-bit address is used for each memory word, with the most significant bit being a "1" for the buffer section 52 and a "0" for the CE section. The next seven most significant bits define the CE# or address.

A mass storage device in the form of a cyclic or ring memory 54, such as a large magnetic drum, constitutes the main memory of this computer system. The memory 54 is connected by way of read-write devices and access circuits 56 to the word bus 32 for transferring signals to and from the data register of the memory 20. The memory 54 may be a large scale device of the order of four million words with about 4,000 tracks and 1,000 words to each track. The drum tracks are arranged in a plurality of sections; sections 58, 60 and 62, each consisting of several tracks, are respectively associated with and dedicated to separate ones of the computer entities 42 and the associated terminals 24, 26 and 28. The remainder of the mass memory 54 may be divided and used in any desired fashion, for example, a large section 64 is available for assignment by parts to any of the computer entities that require a larger memory area, a section 66 is assigned for common data files to be used by a plurality of the computer entities 42, and a section 68 stores programs, routines and other aids that are used in common by a plurality of the computer entities 42. The cyclic or ring mass memory is used as the main memory to provide maximum storage, both dedicated and available in common, to each CE. The cyclic memory also has the advantage of relatively low cost. Various types of cyclic memory may be used (e.g., magnetic discs, endless-loop magnetic tapes, recirculating delay lines); they have the general characteristic of the storage being arranged in a ring or closed loop and available for access at different times in a repeated cycle. Such memories may be electromechanical and involve moving parts or may be static and employ electronic cycling.

A supplementary control unit in the form of a content-addressed, or associative, memory (CAM) 70 directs a drum-transfer selector 72 via control line 74 to control signal transfers between the main cyclic memory 54 and the CE's 42; the buffer transfer operations between the drum 54 and the buffer memory section 52 are directed by the processor 22 in any suitable known fashion, e.g., by means of the selector 72, as indicated by the control line 76. The selector 72 is a small processor which may be similar to a selector channel 30 used for controlling input-output operations under the direction of the central processor 22; such control devices are known in the art. Selector 72 receives signals, via line 78, representing the successive angular storage positions of the drum 54 and relates those positions to the drum addresses supplied from CAM 70 or processor 22 via line 74 or 76. The selector 72 also supplies control signals via line 80 to operate the drum access circuits 56 for reading or writing in the required drum tracks and angular positions, and supplies signals via control line 82 to operate the random-access memory 20 for writing or reading at the memory addresses specified by CAM or the processor 22.

CAM 70 includes a plurality of storage sections 84, each individually associated with and dedicated to a CE 42, which storage section 84 stores a control word that defines the request of the associated CE (e.g., seeking a drum transfer or access to processor 22) and the specifications of the drum transfer, including addresses of the drum and of memory 20. CAM also has a search register and control 86 which stores the argument of the search to be made by CAM among its stored control words. The search register and control 86 receives signals from selector 72 via line 88, which signals represent each successive angular position of the drum 54 and initiate a search among the stored control words for a requested drum transfer at that drum position. The processor 22 also supplies signals via line 90 to the search register 86 to initiate a search among the stored control words to locate the next CE waiting to be processed. CAM 70 has an input-output register 92, which receives the drum-transfer control words from the processor 22 via line 98, and which supplies to the selector 72, via line 74, the drum-transfer information developed by a drum-transfer search in CAM. The latter develops in the processor-wanted search and supplies to the processor 22, via line 96, the address of the next CE which requires processing.

Thus, CAM 70 forms a queue of all of the stored drum-transfer requests from the CE's 42 and a queue of those CE's that call for the processor 22. The transfers between the drum and the specified CE's are successively performed by the selector 72 under the direction of CAM and in an order related to the angular position of the drum 54 at any instant, so as to complete an optimum number of transfers in each drum cycle. The processor 22 performs the processing successively for each computer entity 42 under the direction of CAM 70. That is, the processor 22 is supplied via line 96 with the address identification of a CE 42 that contains instructions and data ready for processing, and the processor stores that CE# in a base register 130 and operates with that CE as a computer unit. The instructions from the assigned CE are processed via the instruction register 112 of the processor operating on operands stored in specific registers of the CE. A local program counter (LPC) 134 maintains a count of the successive CE instructions being processed, and when the supply of instructions in the CE is exhausted the LPC 134 initiates an instruction fetch from the drum 54 by means of a control-word generator 118 that transmits a drum transfer request to CAM, via line 98. In addition, the programmer can direct an instruction fetch by means of a "jump" instruction to a specified drum address, or an operand fetch or store at a specified drum address; these drum transfers are also initiated via the generator 118. Each CE stores a small number (e.g., about a dozen) of the instructions of its program, together with the associated operands. The operands for these instructions are stored in registers of the CE and their addresses are referenced in the instructions by register addresses. The processing for a particular CE varies with the stored program and may involve, on the one hand, performing the small number of stored instructions or, on the other hand, merely checking the status of the CE, which calls for the initiation of a drum transfer. Consequently, whenever the processor 22 completes a certain small amount of processing for a particular CE 42, this operation is generally accompanied by a drum transfer to store processed data or to fetch additional operands or program instructions, and the details of this drum transfer are supplied to CAM 70 in a control word via line 98. At the same time, CAM 70 receives signals via line 90 indicating that the processor 22 is ready to process the next CE, and CAM performs the appropriate search and supplies the address of the next CE via line 96, whereupon the processor 22 proceeds in a similar fashion with the next CE.

SYSTEM THROUGHPUT AND EFFICIENCY

A user-programmer writes stored programs for the main cyclic memory 54 in the same fashion as for a random-access memory. That is, the memory 54 is directly addressable on a single level, since the drum addresses are the only ones in the system. The programmer also has half or more of his CE registers available for working storage (such as for operands being processed and data results), indexing, accumulating, and the like. Operands are transferred into these registers as they are needed by the program instructions, and the latter address these registers directly for execution. About a dozen words of a CE are assigned for use as a buffer store of instructions; but this is automatically and repeatedly filled without any attention of the programmer. The remaining registers serve, without the attention of the programmer, to handle various housekeeping functions, whereby each CE operates as an independent virtual computer. Each individual CE is generally always coupled into the system, either engaged with the processor in executing its user's stored-program instructions, or engaged with the main memory in a data or instruction transfer, or in a queue for one or the other. Where a CE is waiting to be coupled to the processor, the waiting time is a short one (e.g., a queue of only about 10 CE's); since the processor is coupled to each CE for a small number of instructions, executions before a main-memory transfer of data or instructions are required of that CE. Moreover, on the average, each CE is in a queue with most of the other CE's for drum access, and may expect to attain, on the average, a little less than two accesses to the main memory over each drum cycle, which is about the same as if it were the only CE seeking access thereto. The losses due to conflicts of two or more CE's seeking access to the same angular position of the drum and due to head switching for many accesses over each cycle are relatively small from the standpoint of their average effect on the drum-transfer efficiency for each CE. Thus, each CE operates in real time, so that the program of each user is always being processed by the system similarly as it would if it had exclusive control over a drum-memory computer with an extremely small buffer memory of the random-access type.

The central processor 22, as a high-speed computing unit, is kept busy successively processing the instructions and operands in the registers of one CE, and thereafter in another CE, and so on. As soon as the central processor completes its assigned tasks for one CE, CAM 70, operating at comparable high speed, assigns the next CE, so that the processor 22 maintains its overall efficient operation. The CE's are used and function at all times as independent computer units that time-share a common central processor. A sufficiently large number of CE's are provided so that there is always a queue thereof waiting for processing by the central processor. This efficiency in processing is maintained using a relatively slow mass cyclic memory 54 as the main storage, and a relatively small high-speed memory for the computer entities 42. The drum (main-memory) transfers for these CE's are maintained as a queue in CAM and are executed efficiently over each drum cycle. For example, in the illustrative drum system having about 1,000 words serially arranged on each track over the drum cycle, an individual computer entity may be able to obtain on the average about two accesses to the drum for transfer of data and instructions. Where some 128 CE's are seeking such access over each drum cycle, and where the CAM 70 orders the access requests efficiently over the drum cycle, a relatively high efficiency of the overall drum "throughput" is attained. An ideal throughput of 100% would represent complete use of every word time slot in each drum cycle; a maximum effective throughput would be about 67%, where about one third is lost due to time slots that are inaccessible during a cycle due to head-switching response times. Some latency in the drum access for an individual CE exists in this system, but the latency for any one CE is largely filled in by the drum accesses attained by the others. Thereby, the economic losses or latency inefficiencies associated with such cyclic memories are largely eliminated in terms of the overall system efficiency. For example, a magnetic drum memory ordinarily would have an average throughput which is only a fraction of one percent of its maximum (2 accesses out of 1,000 time slots); in the system of this invention, the drum throughput rises to the order of 50 percent of the maximum effective throughput or transfer rate of the drum, where a substantial load of 128 CE's are operating simultaneously. Larger computer systems would tend to increase this drum efficiency even more.

Due to the inherent character of the system, it has time-sharing applications in the multi-user systems that are required today. In addition, the system may be used for batch processing, with any larger part or all of the system being used to handle a major computing problem; in such a situation the individual CE's are used to process subdivisions of the computing problem, with their individual efforts coordinated overall to obtain a corresponding increase of speed for many problems. No special burdens are placed on the user-programmer in writing stored programs to be processed by the system, either by an individual CE or by coordinated CE's, since the programs are written with the instruction and operand addresses all referenced to the main memory 54. If it should be desired to organize a group of CE's to work together on one larger problem, by breaking that problem into smaller parts, the program for the large problem is divided and assigned without rewriting it, so that each individual CE handles its assigned part, either exclusively or in common with the others, directly from the program in the main memory 54. When a program has been written to take advantage of $n$ CE's working simultaneously, the value of $n$ may be changed at run time and the program will still operate. Known techniques of dynamic release and acquisition may be used by a supervisory program to decrease or increase respectively the number of computer units working on a program.

In many processing and computation problems, the instructions of the program tend to form in sequential groups, as do the operands themselves. Accordingly, to the extent that such natural sequencing exists within the instructions and data of a program, the transfers to the instruction-buffer registers of a CE and to its working-storage registers reduce the number of drum transfers and make efficient use thereof.

This system does not need paging of data or programs, which is often required in present-day time-sharing systems. That is, in paging, records of a certain size and structure (e.g., of the order of 100 to 1,000 words per page) are read into the random-access memory from secondary storage each time. It has been found in such systems that some 40 pages of program and data may be required to operate efficiently on a program. Accordingly, on the basis of about 500 words to a page, some 20,000 words of random-access memory would be required in any one instant to handle a particular user. With a high-speed memory of 100,000 words, only five users could be handled on a time-sharing basis at any one instant. Accordingly, the remaining users could not be handled at the same time and their programs would not be in operation, temporarily at least, so that the overall time-sharing would not be on a real-time basis. In the system of this invention, each computer entity is working with the processor to form a complete unit at all times, whereby it operates on a real-time basis at speeds comparable to those of a small drum computer. Where faster speeds are required for real-time operation, a plurality of CE's can be combined, as noted above, to operate concurrently to deal with the overall problem, and such combining of CE's can be handled flexibly as it is needed.

Unlike a paging system, the user-programmer of this invention need not concern himself with the record size or structure, be it a "block" fixed by the hardware, a "segment" defined by the stored program, or a "page" defined by the automatic transfer of large blocks of data between secondary (e.g., drum) mass storage and the main random-access memory. Any size block of data or instructions, large or small, can be transferred between a CE and the main memory within the limits of the number of working registers and instruction-buffer registers in the CE. Thus, the programmer is not restricted by any record structure and the division lines thereof, and he works directly with the basic data and instruction word and addresses the mass drum memory as the main one. It is not necessary to plan a page structure in an auxiliary mass memory, for the main memory is itself the mass memory and contains most all of the programmer's files, either dedicated or in common with other users. This feature is important in coordinating a plurality of CE's to work on different segments of a batch processing program and in giving CE's access to common memory files.

In addition to the thousands of words of main-memory storage afforded to each CE, additional thousands of words may be semi-permanently assigned exclusively to a particular user or users as may be required. In addition, a very much larger store of re-entrant programs and files of reference data and the like are available to all of the CE's on a common basis. The re-entrant files can be protected to ensure that the user program can only read from these files and not change them. In addition, certain files can be used in common by a plurality of CE's, and the use by one can inhibit simultaneous use by any other, until the first one has completed its use. Thereby, one CE can be used to develop a processed file, and another CE can subsequently use that processed file for its own processing. Controls are provided, by means of an extended portion of CAM 70, for each CE to establish for, and release from, its exclusive use certain specified drum files, and for each CE to send control messages to any other CE. Thereby, and by means of the common access to drum files, each CE and its stored program can communicate with and influence in a variety of ways and other CE and the execution of its program.

The system of FIG. 1 lends itself to various types of use. For example, each user may have possession and control of his own terminal 24, 26 or 28. In addition, he has assigned and dedicated to him certain portions of the system, namely, the registers of one or more CE's 42 of the high-speed memory 20, certain tracks of the cyclic memory 54, and a storage portion 84 of CAM. In addition, a user time-shares the other portions of the equipment, including the I/O selector channels 30, the central processor 22, the buffer store of the high-speed memory 52, the control portion of CAM 70, and the drum transfer selector 72. In this fashion, the user has available to him a complete computer system as indicated in FIG. 1 by the shaded sections of the system; namely, the console 44, the drum tracks 62, a CE 42, CAM storage 84, and the other time-shared sections previously noted.

The overall system is directed by a supervisor, which is preferably and primarily a stored program. In some designs, a distinct CE is dedicated to the supervisor and to operating its program. In other designs, the supervisory program may make use of any of the CE's which are not in use, and may also use any particular CE to carry out the supervisory functions for that CE. The use of the computer system may start with a user sending an identification message to the I/O selector channels 30, which may include a communications exchange, which connects the user with the first available CE (i.e., assigns a CE# to that user's terminal); if none are available, a busy signal may be returned. The user may contain for his use as many CE units as he requires, if available, and once connected, he has the unit completely at his disposal. When the user is connected, he provides the CE with certain identifying and accounting information, which the superior obtains from the CE for allocation of storage space in the cyclic memory 54. Thereby, the user's account is established to determine his use of the system. The user requests from his terminal the amount of cyclic memory that he requires in his computations. He may require two types of cyclic memory space; one is the "private" memory for his own private files of programs and data, the other is the "public" memory areas which store programs and files of general value to all or some users, including various programming systems, reference data, and the like. The user generally is permitted only to read this information, but not to write or modify it, except under special controls.

The supervisor, when receiving the request, checks the availability of the memory space and enters the limits of the memory addresses into prescribed portions of the assigned CE (alternatively, and in addition, the assigned CAM storage area is used for specifying and controlling certain limitations of this type). The limitations on his use of the system are also set forth in his assigned memory areas in terms of areas that he can read-in and/or write-in. Where a user requires more than one computer unit, he may be assigned a plurality of CE units and corresponding drum tracks, and he can program his computation to have the CE units work cooperatively and communicate with each other. In addition, the user may require a plurality of terminals and a selector channel 30 dedicated to his own terminal and a certain amount of system input-output equipment for his exclusive or time-shared use; all of this is specified by the user, and the supervisor arranges for the assignment where appropriate. A plurality of CE units may be assigned to a single terminal or several terminals to a single CE, as may be required in a configuration to meet the user's needs. The supervisor, in effect, has a general store of computer system components which it can assign as a storekeeper in various configurations to individual users. The user does not know which CE units are assigned to him; these are assigned at the I/O selector channels by allocating the CE# to a particular terminal. Thereby, all high-speed memory addresses referred to by a user are by way of register numbers applicable to all CE's with the CE# automatically assigned to a particular terminal's communication as it passes through and is processed by the channels 30. As a user terminates his particular usage of various portions of the system, the termination is monitored and directed by the supervisor and recorded for accounting of computer time that is utilized. As one user gives up all or part of his system configuration, the released units are returned to the general store and are available for reassignment to other users as required.

Such a procedure of use is prohibitively expensive without a time-sharing of computer system resources. The expensive portions of the system are time-shared, including the large shared portion of the cyclic memory, the central processor, the large buffer store section 52 of the high-speed memory, and the search facilities of the CAM. With this system organization, it becomes feasible and economical to offer independent computer services to various users. Each user has the entire possession of the high-speed registers in the CE assigned to him, and other users cannot interfere with his use of that CE or his dedicated section of the cyclic memory. The user's program maintains exclusive control of his CE at all times, until his computations have been completed. In addition, a user is able to communicate with his own CE directly to read out of or write into certain registers thereof. Thereby, he can monitor and direct the execution of a program in his CE as though in a computer exclusively under his control.

Where a plurality of computer entities are working for a single user, they may be operated independently as the processing permits, and where one CE depends upon the results of the other, the individual CE's may be started and stopped by appropriate instructions and control words via the content-addressed memory. The results of one CE operation may be stored in appropriate tracks of the drum that are accessible by the other CE, so that full communication between the two can be achieved.

COMPUTER ENTITY REGISTERS

Figure 2:
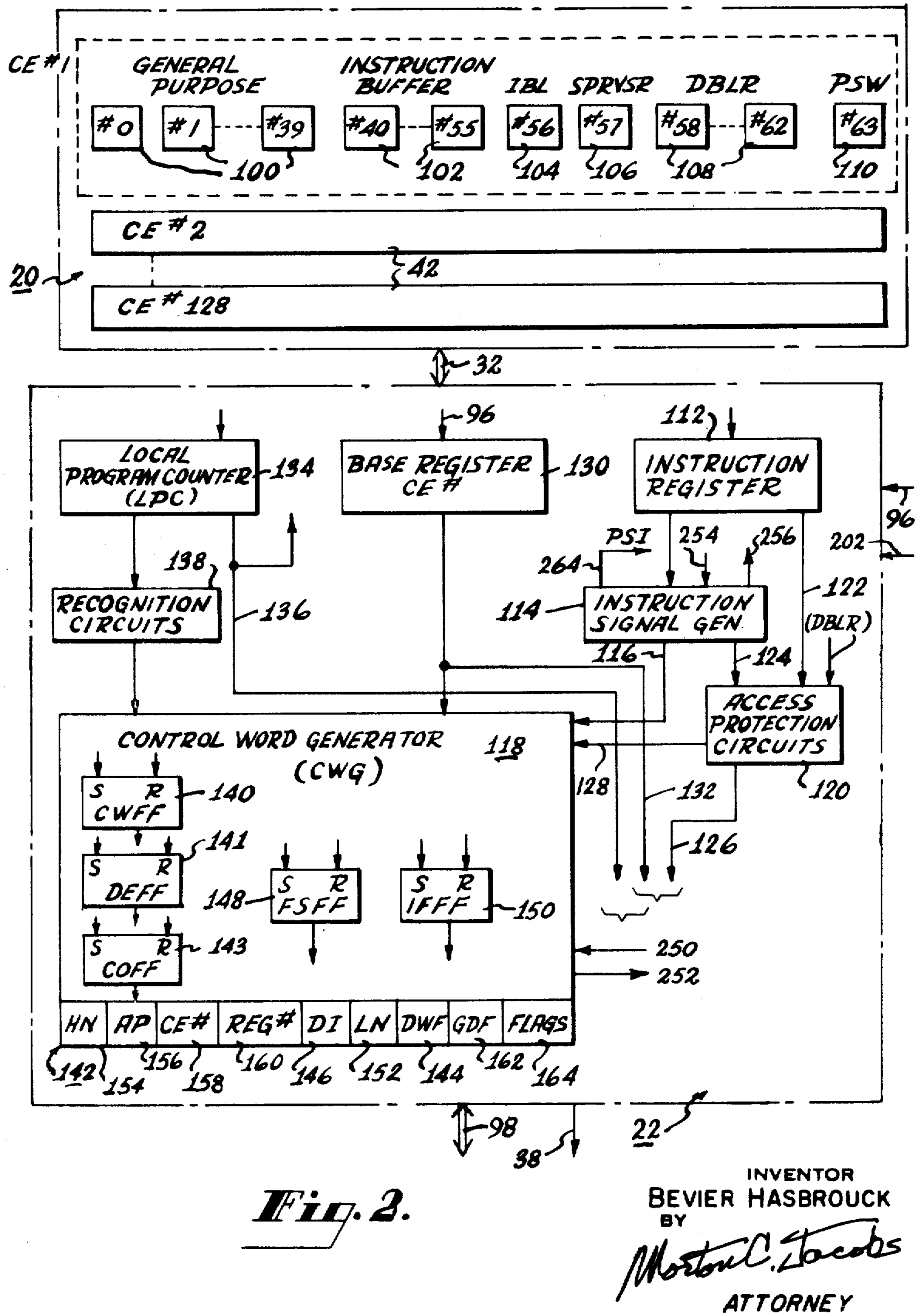
FIG. 2 is a schematic block diagram of a portion of the system of FIG. 1, showing details of the high-speed memory and processor.

Each CE 42 is constructed in substantially the same fashion; in the particular illustration represented in FIG. 2, a CE is composed of 64 word registers of the high-speed memory 20. A set of general purpose registers 100 form the largest group thereof, and in the illustrated example of FIG. 2, these registers are addressed as #0–39. These registers are freely usable by the ordinary programmer for any suitable purpose, such as for accumulators and index registers, for working storage to hold partial results, operands, flags, exit lines, constants and consecutive words of data. A set of instruction-buffer (IB) registers 102 bear addresses #40–55 and are used only for storing a prescribed number of sequential instruction words; 16 words in the illustrated example. An IBL register 104 stores the drum address of the first instruction in the instruction buffer; i.e., the drum address of the instruction stored in REG #40; it is used to locate the drum address of the succeeding instructions on the drum. The IBL register has a prescribed address, which is #56 in the illustrated example. A register 106, #57, is used by the supervisory or executive routine, and functions as a push-down pointer and limit. That is, the supervisory routine can use the various CE's and store intermediate work which it performs on behalf of a particular CE in various registers identified according to the pointer register. This register identifies the individual registers, and the limit portion thereof notifies the supervisor when it has exhausted the assigned work area in the CE registers.

A set of drum base and limit registers (DBLR) 108 define the addresses of drum tracks that may be accessed by the particular CE in addition to the permanently assigned tracks of the drum. By way of illustration, four of these DBLR registers #58–61 define the drum addresses of files and programs on the drum that are used and updated in common with other CE's. The DBLR

#62 defines additional working area of the drum which is semi-permanently assigned to the particular CE, in addition to the set of permanently assigned drum tracks that form the basic main memory for each CE. Generally, entire tracks are assigned semi-permanently or permanently to the particular CE, so that other CE's cannot gain access to any part thereof. PSW register 110 holds a program status word representing the status of the various hardware flip-flops and other circuits of the processor 22 when the particular CE is in an inactive state and not operating with the processor. That is, whenever the operation of the processor with a CE is interrupted, the program status thereof is stored in PSW register #63 so that, upon reactivation of the particular CE, the processor status can be restored to pick up where it left off. This technique for maintaining the status of a program upon interruption and removal from a processor is known in the art. The contents of the processor-status word (PSW) may vary for different machine systems; illustratively, this word may be composed of certain bit fields representing the contents of LPC, overflow and underflow on add and floating point operation, interrupt-status and control signals, supervisor and certain privilege-instruction signals. The remainder of the program status, such as the contents of working registers and the rest of the overall program counter (namely, the contents of IBL) are always maintained in the CE registers.

The address of any register in a CE is defined by the CE# representing the eight most significant bits of the address (the most significant of which is always a "0" for convenience in addressing), and the REG# representing the six least significant bits of the address. REG #56–63 are protected from any changes attempted by the user-programmer (i.e., Write-protected). Thereby, a user programmer is insulated from inadvertently affecting his own operation or gaining access to the operation of the CE's and memories of other users. REG #40–56 are partially protected against inadvertent malfunction; for example, a distinction is made between the handling of an instruction fetch and a data fetch, so that only instructions can be written into the instruction-buffer REG #40–55. For example, all registers in each CE having a binary address with a "1" in the positions of "bit 32" and either "bit 16" or "bit 8" are so protected, that they are not addressable by the user.

PROCESSOR

In FIG. 2, the central processor 22 includes an instruction register 112 that receives each of the program instructions to be performed by the processor. The instruction format may be of any appropriate type commonly used in stored-program computers, and would normally contain the coded instruction operation as well as the register addresses of REG #0–39, which contain operands, working storage, and results. In addition, for drum fetch and store instructions, the drum addresses as well as the register addresses are set forth. Instructions may be of variable length so that the different requirements of various types, including those of drum transfers, can be met. An instruction signal generator 114 converts the instruction code stored in register 112 to an appropriate set of control signals for the processor operation in a fashion well known in the computer art, for example, by decoding the instruction code and encoding the decoded signals in appropriate combinations of concurrent and sequentially timed control signals for the arithmetic unit and central control unit. In addition, in connection with drum transfer instructions, an appropriate set of control signals are supplied via control line 116 to a control word generator (CWG) 118. The address portions of an instruction stored in register 112 are supplied to access protection circuits 120 via control line 122. In addition, these circuits 120 receive, via control line 124, appropriate control signals representative of the character of the instruction operation. The access protection circuits check the REG# addresses to determine whether they are suitable for writing in connection with normal processing operation, and these monitored 6-bit addresses are supplied as outputs therefrom via control line 126. In addition, the protection circuits 120 determine whether the REG# addresses are proper ones in connection with data fetches from the drum (to ensure that only the general purpose registers #0–39 receive such data); in connection with instruction fetches from the drum, only the instruction-buffer registers #40–55 are used; the drum and register number addresses that have been monitored are passed via control line 128 to CWG 118.

A base register 130 receives the CE# (i.e., the eight most significant bits of a CE address in the high-speed memory 20). This CE# is supplied to CWG 118, and is also utilized, via line 132, together with the REG# carried by line 126 for addressing various ones of the general purpose register 100 in the high-speed memory during normal processing. A local program counter (LPC) 134 is used as a five-stage counter to register the word count of the instruction #0–15 from the instruction buffer 102 that have been processed. When the counter 134 registers an overflow, a count of #16, the last instruction in IB REG #55 has been processed, and an instruction fetch is required to bring in a new set of instructions from the main drum memory 54. The state of the local program counter 134 is monitored in recognition circuits 138, and when the overflow count of #16 is recognized, the circuits 138 supply a signal to the CWG 118 to set a control-word flip-flop (CWFF) 140, which initiates the operation of the CWG 118 and also terminates the normal cycling of the processor 22 until the next CE# is supplied via line 96 to the processor 22, when FF 140 is reset. A number of other control FF's are employed to control various operations that are involved in the control word generation and in the transition control of processor decoupling (e.g., DEFF 141) and coupling (e.g., COFF 143) with a CE. CWG 118 initiates a set of control operations to generate a computer-entity control word (CECW) which is illustrated as being formed in a CECW register 142. A separate register for this purpose may not be required in various appropriate computer designs, since the signals required therefor are generally available in registers of the processor 22 and can be directed therefrom to output lines 98, which supply them to the CAM 70.

CONTROL WORD GENERATION

The CECW includes a 1-bit field for a drum-wanted flag (DWF), and a 1-bit field 146 identifying the direction (DI) of the drum transfer, be it a fetch or a store. A flip-flop 148 is set or reset accordingly as the transfer is a fetch or a store, and the instruction signal generator 114 supplies the appropriate signals therefor in connection with drum transfers of data as well as instruction fetches initiated by a "jump" instruction processed by the instruction register 112. An instruction fetch flip-flop 150 is set in the case of "jump" instruction signals supplied by the generator 114, and also in connection with corresponding signals supplied by circuits 138 when the instruction buffer has been exhausted. In the case of instruction fetches, the length of the fetch is 16 words to refill the buffer 102. The drum address is formed in two fields 154, 156, as the head or track number (HN) 154 and the angular drum position (AP) 156. In connection with data transfers and instruction fetches initiated by jump instructions, the drum address is supplied by the addresses in the instruction register after monitoring in the access protection circuits 120. This jump address in the drum also becomes the new IBL drum address, and it is jammed into register #56. In the case of an instruction fetch initiated by exhaustion of the instruction buffer, the contents of CE REG #56 are obtained from the memory 20 and added to the contents of the local program counter 134 to obtain the drum address of the next instruction, which is returned to IBL register #56 and established in the CECW register sections 154 and 156. The CE address for the drum transfer is formed in two sections; the CE number is obtained from the base register 130, and established in register field 158. The REG# is established in register field 160, and originates in different ways depending upon the nature of the drum transfer. In connection with instruction fetches, identified by the set state of IFFF 150, the REG# is always #40, the initial word register of that buffer. In the case of data drum transfers, the REG# is determined by the addresses set forth in the instruction in register 112. Other control words may be generated, as discussed hereinafter, and other flags may be provided to identify such words in register fields 162 and 164.

In operation, a control word is generated in processor 22 each time a drum transfer is called for by the program instruction (i.e., by a "jump" instruction or by a data fetch or store instruction) established in register 112, or when the list of instructions in buffer 102 is exhausted as indicated by the count established in LPC 134. The control word that is formulated includes the initial drum address in sections 154 and 156 of CECW register 142 and the initial high-speed memory address established in sections 158 and 160. The number of words of transfer is established in section 152, which automatically determines the succeeding drum addresses and succeeding corresponding high-speed memory addresses between which the words are transferred. The protection circuits 120 determine whether these drum and register addresses are proper ones within the user's system, with the DBLR registers 108 of the particular CE determining the propriety of the drum addresses. The user-programmer cannot modify the contents of the base register, and therefore cannot gain access to the registers of another CE; though communication between CE's is enabled by access to those tracks of the drum that they have in common, and by access to CAM and ECAM. Moreover, in this embodiment only six bits are available for the REG# address, so that the programmer cannot address a register in any CE other than the one defined by the CE# in the base register. For other embodiments, the access protection circuits 120 may be used to limit the programmer to access to only certain limited registers within his own CE register set.

CWG 118 performs suitable control algorithms for coupling and decoupling the processor with the CE's and for generating a CECW. The algorithm for decoupling and CECW generation is initiated by the setting of CWFF 140 and DEFF 141 and setting or resetting of any other control FF's that are needed. This algorithm has variations depending upon the character of the drum transfer to be performed, as set forth above. When the CWFF 140 is set for the generation of a CECW (and DEFF 141 is set for decoupling), the conditions of the various processor flip-flops and other circuits which define the status of the processor at the stage of the program then reached are transferred as a set of control signals forming a processor status word to the PSW REG #63 where they are stored until that CE is again assigned to the processor 22 for processing. That is, REG #63 is established as the address field on line 126, and the PSW fields are gated out of the processor flip-flops and registers into REG #63, the CE is decoupled, and DEFF 141 is reset. After the CECW established in register 142 is sent to the CAM 70, the processor 22 remains in a quiescent condition as determined by the set condition of CWFF 140 and the appropriate conditions of the other control FF's. When the next CE# is supplied, via control line 96, from CAM 70, that CE# is jammed (under control of a Null signal, described below) into base register 130, and the COFF 143 is set to initiate coupling of the processor to that CE#. Thereupon, the REG #63 address is established at line 126, and the processor 22 obtains the processor status word in REG #63 of the CE# established in register 130; the CE is thus coupled to the processor and COFF 143 is reset and finally CWFF 140 is reset. The processor is then in the status it was in when it was previously decoupled from the particular CE. Accordingly, the next instruction from the instruction buffer (which is identified by LPC) is read into the instruction register 112 and the processing of successive instructions and the data in the general purpose registers #0–39 are performed until another CECW is to be composed, and the operation described above is repeated.

CAM

Figure 3:
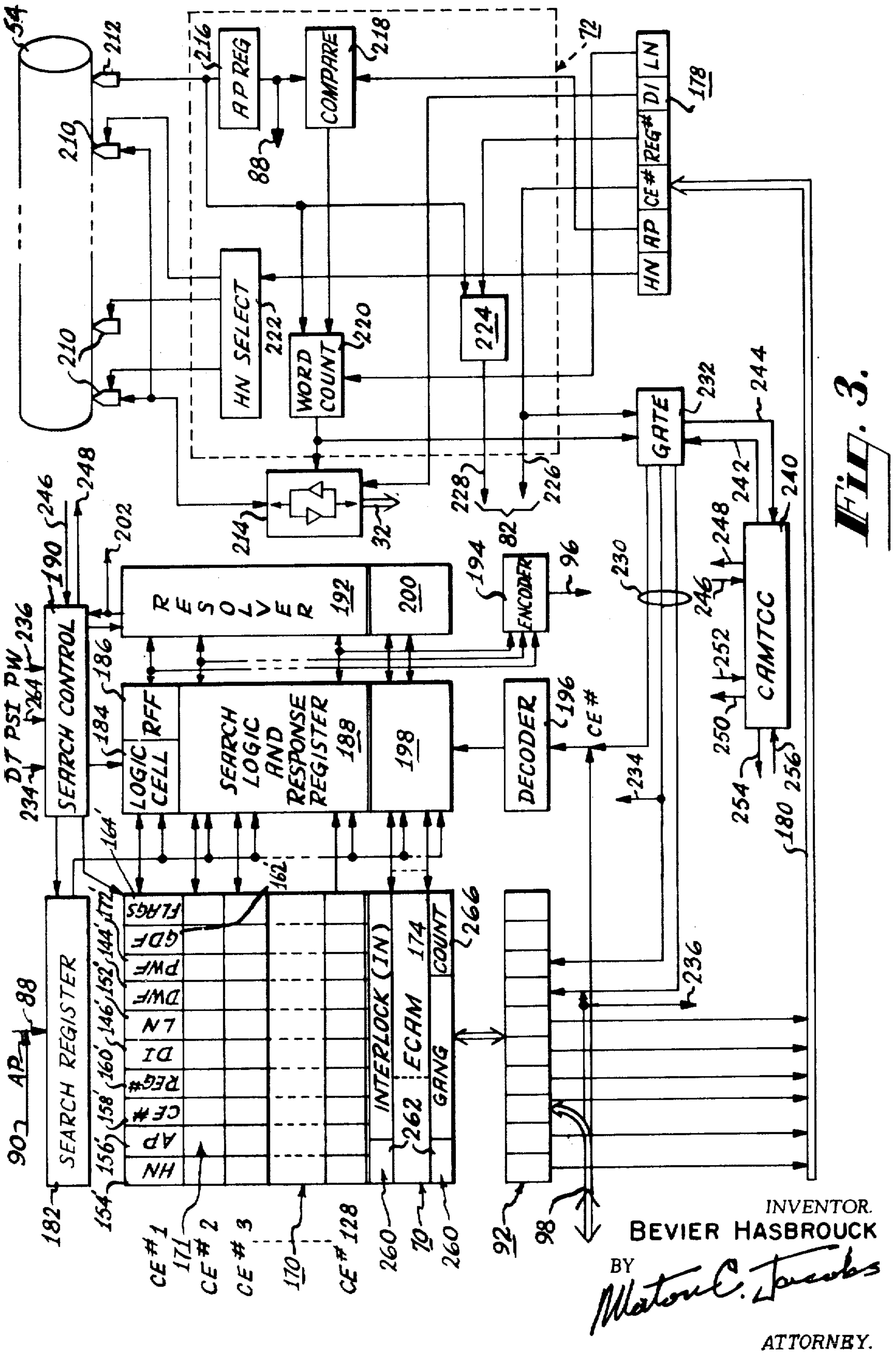
FIG. 3 is a schematic block diagram of another portion of the system of FIG. 1, showing details of the content-addressed memory and drum-transfer selector.

As shown in FIG. 3, CAM 70 includes a high-speed memory matrix 170 of storage cells arranged in rows for storing control words (128 words in the illustrative embodiment); each row 171 is associated with and dedicated to one of the CE's. The words are further divided into fields corresponding to those of the CECW register 142 (FIG. 2), and these fields are represented in FIG. 3 by corresponding numerals with the addition of a prime ('). An additional 1-bit field 172' is employed for storing a processor wanted flag (PWF), which flag is generated upon completion of a drum transfer by the selector 72 for a particular CE. An extended portion 174 of the CAM matrix provides a pool of control words that may be used for various purposes, such as for intercommunication among the CE's, for interlocks, and other controls as described hereinafter. This extended portion (ECAM) 174 may be designed with less than 100 rows of matrix or with several hundred rows, depending upon the particular complexity of the system. An input-output register 92 is coupled to the matrix 170, 174 of storage cells for reading and writing therein, and is also connected to the control bus 98 for receiving the CECW from the processor 22 and for supplying signals back thereto. A CAM-holding register (CHR) 178 receives certain fields of the control word in register 92, after a drum-transfer search, via bus 180; these fields are those required for operation of the drum transfer selector 72. A search register 182 receives the search criterion for searching within the matrix 170.

The search logic for the CAM 70 may take various forms, known in the art for content-addressed memories. One suitable form includes that of providing a separate cell 184 of search logic for each row of the CAM matrix 170. The cell logic includes a combination of gates and a response flip-flop (RFF) 186; these flip-flops for all the rows form a response register 188. Each logic cell 184 receives sequentially all of the query bits of the search criterion stored in search register 182, one bit at a time, as well as the data bits in the corresponding fields of the associated row in the matrix 170. A search control 190 stores search commands, and when prior CAM activity is completed, initiates the search logic operation and defines for each type of search the fields of the words in the matrix 170 that are to be searched. It gates corresponding bits from the search register 182 and the rows of the matrix 170, one bit at a time, to the associated logic cells. When there is the desired coincidence between the query bit and the corresponding data bit in each matrix row, the associated search logic sets RFF; otherwise it is reset. Once reset, an RFF cannot be set again during the search, so that only those RFF's that meet the entire search criterion remain set after all of the bits of the search criterion are compared with all of the corresponding data bits in the matrix 170. Response register 188 then contains a set RFF for each CE row word that meets the search criterion. If all of the control words fail an equality test on the next AP of the drum, the test is repeated on the succeeding AP, until equality is met.

Thereafter, resolver circuits 192 resolve any conflict that may exist due to more than one RFF 186 being set; the resolution may be determined on any appropriate basis, such as by means of certain priority criteria. That is, certain CE's may be given priority for drum transfers or to be coupled to the processor. For many purposes, the lower-numbered CE's may be given higher priority, and the resolution is achieved by coupling the RFF's so that each is coupled to the next in ascending number sequence, whereby a set RFF resets the succeeding RFF's of higher number. The single RFF 186 which remains set then determines the information which is supplied from the CAM 70. In the case of a drum transfer, the information desired is that of the fields to be transferred to the CAM-holding register 178 for use by the drum transfer selector 72. In that case, the CE row associated with the set RFF 186 is enabled by that flip-flop and is read out into the register 92, from which the appropriate fields are transferred via bus 180 to the CHR 178 under control of a signal from the search control 190.

In the case of a processor wanted search, the desired output takes the form of the CE# of that CE cell; and this may be obtained conveniently by an encoder 194 connected to the RFF lines from the response register 188, whereby the single line related to a set RFF is encoded into the associated 8-bit CE#. This CE# is supplied via line 96 to the processor 22 to initiate coupling thereof to that CE in the manner described above. For the purpose of writing a CECW into the proper CE row of matrix 170, a decoder 196 receives the CE# of the CECW on the line 98. The decoder output lines go to the individual RFF's of the response register 188, whereby, when prior CAM activity is completed, the single decoder output line corresponding to the CE# input is enabled and sets the associated RFF 186. The latter, in turn, enables the corresponding CE row of the matrix 170 for storage of the CECW in register 176. For example, the CECW is retained in the processor CWG 118 until the CAM has completed any search it is engaged in, or any other activity, and is ready to have the CECW transferred into input-output register 92.

The resolution of conflicts in a processor wanted search may be performed in the manner described above. If it is desirable to ensure a more uniform amount of processor time for each CE, the resolver 192 may include a register containing the CE# of the last CE coupled to the processor, and priority in resolution may start with the next succeeding CE#. The search criterion in a processor-wanted search is merely the PWF which is the single "1" bit entered in the search register 182 by the control 190 when such a search is initiated. For a drum transfer, the search criterion set up by control 190 is the angular position (AP) field developed on line 88 by the selector 72 and the DWF. Similarly, other flags or fields can be searched within CAM matrix 170 or ECAM 174. A separate search logic and response register section 198 and a separate resolver section 200 therefor are used for the ECAM, which is generally searched for different criteria.

In the course of a processor wanted (PW) search, the resolver 192 detects when none of the RFF's 186 is set and develops a NULL signal on line 202 connected to the search control 190. The search control 190 includes a flip-flop to store the PW search signal for reinstituting the PW search after the passage of a suitable (e.g., about 50 microseconds) time interval. When the NULL signal is received by the search control, CAM is then available for other operations. The NULL signal is also supplied via line 202 to the processor 22, and in the absence of that signal on line 202, the processor accepts the CE# supplied via line 96. In a similar fashion, if a NULL signal is generated on a drum transfer search, CAM is freed, and after a suitable time the search control reinstitutes the drum transfer search.

The drum transfer selector 72 may take various suitable forms well known in the art for transfers between drum and high-speed memories, and an illustrative form thereof is shown in the schematic diagram of FIG. 3. In the drum memory 56 a separate read-write head 210 is provided for each of the data signal tracks on the drum 56 (e.g., for a 4-million word drum memory, about 4,000 heads may be provided for a corresponding number of tracks, with each track storing about 1,024 words). One head 212 is used for reading the clock pulses from a clock channel on the drum 56, with a pulse generated for each word, so that the angular positions around the drum for storage are marked sequentially by pulses that are generated in read head 212, as is well known in the art. The read-write heads 210 are coupled to read-write amplifiers 214, which circuitry preferably includes a series-parallel converter for translating the parallel word format on the word bus 32 to the sequential format for writing on the drum, and vice versa. Any desired recording technique may be used; e.g., each track may store words serially by bits, or a plurality of tracks may have a plurality of bits in parallel to record, for example, serial 6-bit characters.

The drum transfer selector 72 includes an AP register 216, which may take the form of a 10-stage binary counter for counting the 1,024 pulses per revolution of the drum and developing a 10-place binary representation thereof which is supplied via line 88 as the search criterion for a drum transfer search in CAM 70. A comparator 218 receives the AP field from register 216 and the corresponding field from CHR 178, and upon coincidence, comparator 218 supplies an actuating pulse to a word counter 220. The counter 220 receives the LN field from CHR 178, and once actuated, it counts the word pulses from head 212 to enable the read-write amplifier circuits 214 for a word count corresponding to that of the LN field. An HN selector 222 receives the HN field from CHR 178 and decodes that combinatorial field into a selection and enabling of the appropriate read-write head 210 for the single track where the reading or writing is to take place. Similarly, where a plurality of heads are operated for reading or writing in parallel, the selector 222 enables the required heads. Where the data are written continuously from one track to a succeeding track, the transition can be readily accommodated by operation of the selector 222; for example, when the AP register 216 recycles from the last word to the first word, the HN field is augmented by "one" and the HN selector 222 switches the next associated head 210 to the enabled condition. A suitable "blank" region of transition from the last word to the first word in the track may be provided in order to supply sufficient time for the head switching. The DI field of CHR 178 actuates the read-write amplifiers 214 for reading or writing as the case may be. Accordingly, in a manner well known in the art, the drum transfer selector 72 reads or writes (as determined by the DI field) the specified number of words (as determined by the LN field) from the tracks (HN field) and starting with the proper angular position (AP field).

The drum transfer selector also includes appropriate controls (not shown) for operating with the processor 22 to "steal" memory cycles for initiating transfers in parallel between the memory and the read-write amplifiers 214 via the word bus 32. Such techniques are well known in the art, which enables the high-speed processor to operate concurrently with the slower selector 72 and drum circuits except for a particular memory cycle when the selector 72 is prepared to accept a transfer from the high-speed memory or supply a word transfer thereto. The selector 72 may also include means for developing the successive memory addresses for the successive words of transfer. The CE# field of CHR 178 provides the eight most significant bits of the memory address, where the eighth most significant bits is a "1" or a "0" depending upon whether the memory address relates to the buffer store section 52 of the high-speed memory or a CE section, respectively. It is assumed that the selector 72 handles both types of transfers; this description is limited to drum transfers for the computer entities of this invention, since the buffer transfers may be performed in any suitable fashion known to the art. The successive REG# addresses are developed by means of a 6-bit register 224 that receives the initial REG# address from the corresponding field of CHR 178, and thereafter is operated as a binary counter receiving the word pulses from head 212 to step the REG# address accordingly. Thereby, the output 228 of register 224, together with the CE# address lines 226, provide the overall 14-bit memory address for successive words transferred between the memory 20 and the drum 56. Various other suitable forms of selector control devices may be provided for use with this invention. For example, the successive memory addresses may be developed by means of the processor itself, instead of providing separate circuits therefor in the selector 72, all as is well known in the art.

Upon termination of the drum transfer operation, control signals including the CE# of the particular CE just serviced, are generated on line 230 and utilized in CAM 70. For example, upon termination of the enable signal from word counter 220, and when prior CAM activity is terminated, a gate 232 is enabled to pass the CE# field of CHR 178 to control lines 230. The control lines 230 include a line carrying a "0" bit for the DWF field in I/O register 176, and a "1" bit for the PWF field thereof. The CE# field is supplied to decoder 196, which sets the corresponding RFF 186 for that CE#, and thereby, the DWF field 144' of the associated CE# row in CAM matrix 170 is reset to "0" and the PWF field is set to "1". The PWF signal on bus 230 is used, as indicated by control line 234, as a signal to set the search control 190 to initiate the next drum tranfer search, since the previous drum transfer is completed. Similarly, the DWF flag from the processor CECW is used as indicated by control line 236 to set the search controls 190 to initiate the next processor-wanted search, since the processor is waiting for the next CE after sending a CECW.

Various types of associated-memory searches are known: an equality search, a threshold search, and a search for the minimum item. Searches can be combined to form more complex forms. A useful search criterion in this drum-transfer system is that of identifying the CECW word in CAM with the next higher AP above that of the current AP of the drum, which is the search criterion. With this type of search, it need be performed but once, unlike an equality search, and is initiated by completion of the previous transfer, as described above. That is, the search is initially an equality search; thereafter, a threshold search on the AP field based on the next available drum position; and then a minimum search on the AP field of those CECW's that have met the previous ones. When a CECW is found that meets this criterion, it is read out into CHR 178, and the transfer is performed when the drum reaches the AP of the word in CHR. This type of search is advantageous in freeing the CAM to perform a processor-wanted search or any other type of search or function that may be assigned to it.

Various types of content-addressed memories suitable for use with this invention are known in the art. As described, bit-serial searching may be utilized typically at speeds of the order of a fraction of a microsecond per bit, with an overall search time of the order of 10 microseconds. Such a search time affords adequate speed for many applications. Where extremely high-speed searching is required, more elaborate search logic may be utilized for simultaneous searching on the basis of the entire search criterion. For bit-serial searching with a separate logic cell for each CE row of CAM, the search logic and response register can be implemented for less than two dozen gates for each such word. For some applications, time-sharing cell logic may be provided for all of the CAM rows with the response bits held in the associated rows of the matrix. The cell matrix 170, 174 may be constructed with various types of memory devices, such as flip-flops made of integrated circuits, transfluxors, planar thin films, or plated wires, with appropriate wired logic for each cell of memory devices. One suitable form of content-addressed memory is described in the report, "Associative Memory Computer System—Description and Selected Naval Applications," Report No. 25-101-11 Contr. No. NOnr-4068(00), April 1965.

In this invention, CAM supplies stored information that is located by means of a content-addressed search. In general, unlike more elaborate content-addressed memories, the supplied information is not then modified in the course of the search and restored. Accordingly, a simple double storage of information that is searched in one store and recovered from the other is sufficient, which makes possible cheaper constructions that may be used, as explained in the above-cited report. Searching and recovery for PWF (used for CE and processor coupling) can be separately organized from that for DWF and AP (used for drum transfers). For the PWF search and recovery, a string of 128 flip-flops individually associated with the CE's may be used to store the PWF's. The search logic consists simply of a suitable known form of priority circuit to select one of these flip-flops that is in a set condition to store a PWF; e.g., the selection may in simple form choose that CE which is lowest in number and whose flip-flop is set. For the DWF and AP search and recovery, a CAM or various devices may be used, including known forms of queuing controls for a list of drum transfer commands. For example, a queuer controls the sequential comparison of the commands with the current drum AP and if the angle between the AP of a command and the current AP is less than a certain tolerance, the command is accepted for drum transfer and the search finished. Another form of queurer is that which updates a cyclic list of drum commands arranged in AP sequence. The updating consists of inserting new commands in proper sequence. The updated list supplies the drum transfer selector 72 with the commands in sequential order.

CAM OPERATION FOR DRUM TRANSFERS

In operation, when CAM is suitably free from prior activity, a CECW for a drum transfer is supplied from the processor via the control lines 98, and the data fields and DWF are established in the corresponding fields of the I/O register 92, from which they are gated into the corresponding fields of the associated CE row 171 in the matrix 170. At the same time, the search control 190 is set, via line 236, to initiate a processor-wanted search upon termination of any drum tranfser search then in process. The search control 190 initiates a processor-wanted search by establishing the PWF bit as the search criterion in the search register 182, and it gates that bit and the corresponding PWF bits from the matrix 170 to the search logic 188. Thereafter, the control 190 actuates the resolver 192 to resolve any conflicts within the search response register 188, and the single RFF 186 that remains set operates through the encoder 196 to establish a CE#, which is supplied via line 96 to the processor to initiate the operation thereof with the assigned CE. Thereby, the processor 22 is kept busy processing the CE's whenever they call for such processing.

When the drum transfer selector 72 completes an assigned drum transfer for a particular CE, the control signals via line 230 reset the DWF field 144' for that CE so that another transfer is not made for it until it supplies another CECW. At the same time, the PWF field 172' is set for the CE which has had its transfer completed; and, via line 234, the search controls 190 are set to initiate a drum-transfer search upon completion of any processor-wanted search that may then be in process. Thereupon, the search control 190 gates search register 182 to pass the drum-transfer search criterion on line 88 and establish it therein. The search criterion consists of the angular position of the drum at each instant, together with the drum wanted flag. In practice, the angular position of the next available word that may be read from the drum is used as the search criterion in order to provide time for performing the search and the appropriate control operations, so that that word may then be read from the drum. The search control gates the successive bits of the search criterion together with the corresponding bits from the CE matrix 170 into the associated cell logic; the order of searching may be that of the DWF bit followed by the AP field, starting with the most significant bit thereof. Upon completion of the search and establishing the results in the response register 188, the resolver 192 resolves the demands to a single CE, and the CECW fields in the associated CE row are gated out to the register 92, from which they are supplied to the CHR 178 to initiate the operation of the drum transfer selector 72 in the manner described above. Thereby, except for conflicts, every required drum access over a drum cycle is met. Since the drum transfers are all relatively small in the number of transferred words, most of the requests are ordinarily completed during each drum cycle. This operation of the CAM 70 continues to couple the processor 22 successively to the various CE's containing instructions and data ready for processing; thus the CAM provides a queue of the CE's that call for the processor and couples them successively thereto. The CAM also provides a queue of the CE drum-transfer requests and initiates the drum transfers at those portions of each cycle of the drum required therefor, and schedules the transfers so that an optimum number are performed over each cycle.

The CE in the illustrated embodiment is mainly situated in a typical magnetic-core memory, with a single dedicated cell 171 of the CAM memory 170 forming an extension of each CE. For higher performance, frequently used registers of every CE, such as PSW, and with lesser urgency IBL and the DBLR's, are placed into permanent, dedicated portions of faster memory devices. That is, to avoid the time loss in accessing the CE registers of FIG. 2, the PSW, IBL and DBLR registers for each CE, which are generally only involved in transfers with the processor, are arranged in an extra-high-speed random access memory. Such memory may be used for the CAM memory as well, and the search facilities for CAM are external to that memory and are associated with the CAM and ECAM portions thereof.

In this invention, as in most conventional computers, the high-speed random-access memory used for the CE registers is used by several other devices that are unsynchronized in their demand for access. In the illustrated embodiment, as in conventional computers, tape units, drums, card readers, one (or more) processors, etc., can and do demand access to a single magnetic-core memory bank. Since these multiple demands are unsynchronized, bunches of them sometimes arrive simultaneously. The above problem is conventionally solved by means of traffic control circuits (or priority and strobe control circuits) that resolve these conflicts and grant memory accesses according to a built-in priority schedule. The unselected devices may wait for several microseconds until they are serviced. Typically, each device maintains a request signal and input data signals until the traffic control sends back a signal signifying that the data have been accepted. Each device requesting data from the random-access memory will receive from the traffic control a strobe signal telling the device when to sample the data lines for the requested data. These and equivalent techniques are well known in the computer art and are employed with the high-speed random-access memory 20 and the associated bus 32.

Similarly, a number of unsynchronized demands are made on CAM. For example, a drum will complete a drum transfer and demand to change the PWF and DWF flags in the CECW in CAM that are specified by the drum transfer command. The processor generates a control word at CWG 118 and demands its insertion into the specified CECW cell 171. The drum transfer selector 72 demands, via line 234, that a drum transfer search be made in CAM. The processor 22 demands, via line 236, that searches be made in CAM for the selection of a new CE 42 to couple to the processor. The latter, as explained below, may demand a search in ECAM.

With a single processor and a single drum, simultaneous demands on CAM can occur. With multiple drums and selectors 72 and/or multiple processors, the possibilities for simultaneous demands are greatly increased. The CAM needs the same kinds of traffic control circuits (CAMTCC) that are employed for the magnetic core memory 20. The CAMTCC 240 controls, via lines 242 and 244, gate 232 (and an associated flip-flop control), controls search control 190 via lines 246 and 248, CWG 118 via lines 250 and 252, and instruction signal generator 114 via lines 254 and 256.

All the searches and operations performed via CAM quickly produce a result that is either removed from CAM or stored in the passive elements of the memory cells. The active elements (i.e., RFF 186, logic cells 184 and 188, resolver 192, ECAM circuits 198 and 200, CAM input-output register 92, search register 182, search control 190, decoder 196, and encoder 96) are then free to perform a totally different task. The instructions and tasks given to CAM (and ECAM) are all individually completed and leave no residue that inhibits other uses of CAM.

Various forms of suitable components, both large and small, for practicing this invention will be apparent to those skilled in the art from the foregoing description. Appropriate timing and cycling, gating, sequencing, and clearing of registers for different ones of the component portions of this invention and for the required interrelationships thereof are well known and available for the practice of the invention and, since they form no part of the invention as such, are omitted for simplicity of description and illustration.

This invention may also be constructed with a plurality of processors 22 of the same general type, which are incorporated in the illustrated embodiment. Each processor has the same connections to CAM and to the CE's and random-access memory 20. Each processor is coupled to a CE by receiving CE# from CAM and operates with the CE in the manner described above. Thereby, the processing throughput can be increased as may be required for various systems. CAM supplies the next CE# to whichever processor is ready for it, and the CE operates in generally the same fashion with either processor. When the associated RFF 186 in CAM for the selected CE is left set, in addition to generating the CE# via encoder 194, it also operates to reset PWF in the associated cell 171. The processors may also have different characteristics for special requirements. The CAMTCC 240 has additional control lines for each such processor to control signal transfers to and from each one.

The drum 54 may be constructed as a single, integrated unit, or as a plurality of slaved drums that are maintained in synchronism. In addition, a plurality of asynchronous drums may be employed in this system, and each has its own read-write circuits 56 and selector 72 and associated register 178 and gate 232. CAMTCC 240 has control lines 242, 244 for the gate 232 of each such drum system. In addition, CAMTCC 240 has similar control lines for search register 182 to direct the transfer of the AP search criteria from each drum via line 88.

INSTRUCTION FORMAT AND OPERATION

Various forms of instruction formats may be used in the system of this invention. One suitable format for the basic instruction is based on an 18-bit half-word, which includes a 6-bit operation code, a 6-bit S-register code, and a 6-bit T-register code or address. The address codes specifying the S- and T-registers are those for the particular registers in that CE which is then coupled to the central processor 22; and the base register 130 supplies the 8-bit CE# which, together with the S-register address or the T-register address, comprises the 14-bit complete address for that particular register in the random access storage 20. A suitable variety of operation codes may be provided for the various arithmetic and logic operations required in a data processing system, and the two addresses to the S- and T-registers permit the performance of these arithmetic operations on the contents of various ones of the general purpose registers 100. For all ordinary data processing operations, the S- and T-register addresses are limited to #0 to #39; if these addresses are #40 or greater, they are invalid or only suitable for special operation codes, such as those within the Supervisor repertoire (e.g., to change the contents of a particular CE's DBLR registers).

In addition to the basic half-word instruction format, additional one or more half-words may be used for special purposes. For example, an additional half-word may carry a literal constant to be used as data by the preceding half-word instruction; such instruction formats are known in the art. Where an operation code calls for an unconditional or conditional jump, an additional two half-words following the jump instruction half-word are used to carry the starting drum address (SDA), which by way of illustration may be 24 bits, to identify the angular position and head number on the drum to which the jump relates. As described above, a drum-transfer control word is generated in generator 118, using that drum address and the other parameters established in the processor and CE. A drum instruction is used for basic instructions of Fetch Data from the drum to the CE registers and Store Data from the CE registers to the drum. The S-register address of the basic half-word instruction format is used to specify the initial CE REG#, and consecutive words are transferred to or from the drum and from or to the consecutive register addresses as required for multi-word transfers. The T-register address specifies the location of a register that contains a specification word used to control the drum transfer, and this specification word is composed by or supplied by the program itself. Alternatively, the specification word for the drum transfer may be set up in trailing half-words of the instruction; if the specification word is in the trailing half-words, the T-register address can specify an index register type of address modification to be made to the specification word before the drum transfer is executed. In addition, the trailing half-words of a drum transfer instruction may be used in place of the contents of the S-register or T-register. All of these alternatives may be available in the same instruction system to afford programming versatility.

The specification word includes a 24-bit starting-drum-address, a 5-bit field for the number of words to be transferred between the CE registers and the drum, a 3-bit DBLR# which identifies one of the registers 108, which in some embodiments, must be used. The word in each DBLR register 108 may be established in various formats; one suitable format includes a 4-bit field which identifies the permitted modes of operation. For example, one mode may be without restriction to writing or reading in the specified drum address regions; another may permit read only; another may permit reading or writing but only with a prescribed set of supportive instructions (which are also identified in the DBLR word). Another mode, similar to the preceding one, requires the setting of a privilege flip-flop which is in the processor and can only be set by a privileged instruction available only to the supervisory program. Once a Supervisor sets the privilege flip-flop, it is retained indefinitely via the processor status word (PSW) in the register 110 for the remainder of the privileged program, and is ultimately reset either by the program itself or by the Supervisor program. Another mode permits reading only, and only by supportive instructions, where certain special files or programs are made available on a special limited basis. The remainder of the DBLR word includes a 14-bit base track number (BTN), a 9-bit field for the number of data tracks (NDT), and a 9-bit field for the number of instruction tracks (NIT). The sum of the BTN and NDT fields defines the track addresses of the drum in which the data are stored, and BTN minus NIT defines the track addresses for the supportive instructions, which are the only ones that can be used to operate on the special data tracks defined by BTN plus NDT.

As an example of this operation, consider a situation in which CE#97 is coupled to the processor and has an instruction established in instruction register 112 having a drum address of #1,020,876 (which is specified by the combined contents of IBL and LPC, FIG. 2). The 18-bit instruction is "Fetch Data into REG #29 Using REG #16 for the drum specification word" (where the two registers specified are the S- and T- registers, respectively). The drum specification word in REG #16 has the fields for the starting drum address of #12,366, and the number of words of 7 together with the DBLR# identifed as 4 viz, REG. #61). The DBLR REG #61 has the fields for NIT=20; BTN=1,000; and NDT=200; as well as a mode field limiting the operation to "Read Only" in connection with the specified supportive instructions.

The action of th processor under this instruction is to bring the contents of T-register, REG #16, and the contents of DBLR REG #61 into specific registers of the processor 22 to construct a drum-transfer control word (CECW) as follows: The starting address in REG #16 is specified as a relative address, relative to the BTN of the DBLR contents; it is calculated by multiplying BTN by the 1,024 words in each track of memory and adding the relative SDA of REG #16 to the product, and the result is the HN and AP fields. The CE# is 97 and is obtained from the base register 130; the REG# is 29 and is obtained from the S-register field of the instruction; DI is "Fetch" from the instruction and LN is "7" from the specification word in T-register REG #16.

The processor also performs a number of tests by way of a built-in algorithm for the particular instruction, and the contents of the specified DBLR must be tested to determine whether or not the drum transfer is an appropriate one. The following tests are passed in this example: The drum address of the "Fetch Data" instruction that is being carried out is 1,020,876, and is checked to determine that it lies between BTN and the minimum track defined by BTN minus NIT for supportive instructions in the DBLR field, which, in the example given is between the drum addresses 1,003,520 and 1,024,000, and this test is passed (i.e., the transfer instruction address is within the range for relevant supportive instructions). The instruction "Fetch Data" is compatible with the limitation of "Read Only." An additional test determines that the starting drum address lies within the range of addresses between BTN and BTN plus NDT, which test is passed in this example. Since all the tests are passed, the control word is composed to initiate the drum transfer operation described above. If any of the tests are not passed, the control word for the drum transfer is not composed, but instead a special control word is generated for initiating action by the Supervisor program.

In general, the system may be constructed to permit fetching of instructions (under control of the IBL or jump-instruction addresses) from any portion of the main memory 54. The register-access protection circuits 120 prevent access to the instructions in IB 102 except for execution in the usual fashion. Thus, the instructions are not accessible to be read by the user as data or for output; i.e., the user is limited to the working registers 100 for this purpose. For more complex systems embodying this invention, and where higher security requirements are prescribed, limitations on fetching of instructions may be prescribed under the limitation of one or more DBLR registers. The number of these registers may be increased as desired (e.g., in place of IB registers). Only the Supervisor can control changes in the contents of DBLR registers, and thus control overall access to the main memory.

Two types of input-output instructions are PUSH (push data to buffer store 52 from drum) and PULL (pull data from buffer store to drum). The transfers of data between peripherals and buffer store are in a suitable, conventional manner, e.g., under control of the Supervisor. A unit of buffer store is 16 words, and multiples of such units may be called by PUSH and PULL. These instructions follow the same general format as the drum-transfer instructions; however, the S-register portion of the instruction contains the number of buffer-store units to be transferred, and the T-register portion of the instruction contains the address of a register holding a drum specification word. The format of the latter is similar to that described above: For example, the first 3 bits identify the DBLR#, the last 24 bits identify the starting-drum-address, and the intermediate 9 bits are the second through tenth most significant bits of the core address in buffer store to define the starting core address for the first word of the buffer unit (BUA). The REG# field 160 used in generating CECW, the field 160' in CAM, and the corresponding field in CHR 178 are made long enough to hold this 9-bit field and a tenth, most-significant bit, that "0" or "1" depending on whether the field contains the REG # or a BUA address. With minor modification of the drum transfer selector 72, successive addresses of the buffer unit are developed for the transfers between successive word addresses in core and the drum.

An Execute-Contents-of-Specified-Register (ECSR) instruction has the same 18-bit format as the usual CE instruction. The importance of ECSR lies in the ease with which the ordinary programmer can first fabricate and then execute an instruction without first writing it onto the drum. Such an act of writing on the drum may lead to restraints on the programmer in relation to the length of IB 102. The ECSR format contains an operand-code field and a single-register-address field (the other such field is unused). The instruction to be executed is stored in the register identified by the address field of ECSR. The ECSR is performed by transferring the contents of the identified register to the instruction register 112.

MEMORY PROTECTION

Thus, in this multi-user, multi-computer system, protection is afforded to limit a user's access to the main memory. Within each of the portions of a system dedicated to a user, memory space is supplied to store the limitations on access to the main memory. The use of certain registers (DBLR) in each CE affords one practical form of such protection. Other forms may use installation-defined wiring or plugboard in control-word generator 118, or CAM or ECAM; the latter are generally more expensive forms of storage. The CWG 118 may use, for example, an installation-defined plugboard which delimits drum areas to certain functions (e.g., read or write), and to specific CE#'s.

The small amount of random-access storage (i.e., about 64 words) dedicated to each CE is addressed in the form of preassigned registers as distinguished from the main or primary memory, which takes the form of a drum in one embodiment. For practical purposes, in building such a multi-computer system, present-day computers may be employed in which the random-access, magnetic-core memory is used for the CE registers (as well as for other necessary functions, such as buffer storage for input and output). The CE registers may be constructed in any suitable form known to the art for fast registers operable with the processor and to and from which main-memory transfers can take place. Thereby, these CE registers function as working registers, as a small amount of buffer store for instructions, and for certain control and status-keeping functions.

RELATION, SIZE AND EFFICIENCY OF MAIN AND WORKING MEMORY

A mass memory is used as the main memory, and in contrast to the random-storage facility of the CE registers, it has restricted access. The cyclic-type memories noted above are one form thereof. Any memory may be used in which a means gains access to the storage locations in a predictable time sequence from the current memory location to any other, and via the intervening locations, which are usually accessible for reading and writing. Domain-wall shift registers that are individually controllable may be used as a restricted-access main memory in this invention. The system functions with the restricted-access memory as a single-level memory. That is, access to the main memory may be attained for a single word or a small group of words; it is not necessary or desirable to read a large block or page to obtain one or a few words. The programmer need not be concerned with special locating of instructions on the drum for speedy execution. Magnetic tape units or magnetic discs with movable heads may be employed as secondary memory to the main memory for storing less frequently used files.

The small number of registers dedicated to each CE are adequate to keep resident therein at all times the necessary portions of the associated program and its data; generally, except when a CE is awaiting a drum transfer, its program and data are in condition for processing whenever the processor becomes available. A small instruction buffer is employed to handle efficiently the string of instructions between jump instructions. Pragmatically, such jumps comprise about 5 to 10% of the total instructions, or on the average jumps occur about every 12 instructions. For example, a range of about 5 to 30 instruction words of instruction-buffer registers provides a store of instructions to reduce the number of instruction-fetch accesses to the drum. Some wastage of unexecuted instructions is to be expected due to the initiation of an instruction fetch by jump instructions. However, the wastage is small, and the overall gain justifies the cost of a small amount of random-access memory and the wasted drum time. Although storage for only a single instruction may be provided, it may be seen that with a slightly larger amount, a substantial improvement in efficiency is attained.

The working registers 100 provide some buffer storage for operands and result in reducing the number of data transfers to main memory. In addition, it has been found desirable in some computers to provide various numbers of such high-speed registers that can be addressed directly (instead of addressing the main memory) so as to reduce the size of the coding field to address and obtain operands stored there. The numbers of such registers found to be useful vary greatly, from 4 to 100, and the number of index registers varies up to about 100. In the system of this invention, about 30 word registers for general use by the programmer are desirable, and several times as many would be valuable. With these registers 100, the programmer fetches only the small number of data words that he needs, and, unlike a paged system, he does not have to fetch the neighbors of a data word; but the facility is available for fetching the particular ones that he expects to use.

In addition, each CE needs a few registers for retaining program or processor status words, as well as about 5 to 10 registers to delimit the areas of access in the memory 54. As a means of communication with each CE's associated console, or other terminal device, 5 to 20 CE registers may be allocated to handle messages to and from such consoles and terminals. Thus, a suitable range of CE sizes for the foregoing functions is about 45 to 150 registers, which are dedicated to a CE.

An additional quantity of buffer store 52 may be employed with each CE to handle the input-output operations with peripherals and terminals, such as magnetic discs and tapes, card readers and printers, that are part of most jobs. The quantity of buffer storage required may vary on a rough average between ½ to 2 blocks of 128 words per block, or about 64 to 256 words. This buffer storage is preferably assigned to the peripherals themselves, and its use controlled by the system Supervisor. The cost of buffer storage is assignable with the peripheral to the job of a CE, but if a CE is not in use, the buffer storage is unburdened, and thereby free for use on other jobs and not wasted. Since the number of high-speed peripherals (which need large buffers) is generally far less than the number of users and CE's sharing said buffers and peripherals, considerable expensive memory is saved by this assignment scheme.

ANALYSIS OF SYSTEM THROUGHPUT

Thus, the actual amount of expensive random-access storage required for the system as a whole is small relative to the large storage capacity of a restricted-access memory such as a drum. The order of half of that expensive memory is required for input-output peripherals, and about half is dedicated to the CE's. Thus, an economical quantity of relatively expensive storage facility is sufficient for each CE, since the relatively inexpensive restricted-access memory functions as a single-level main memory. Correspondingly, a large number of CE's can be active concurrently and at reasonable cost. Since a large number of CE's are substantially concurrently making largely independent, random demands on the main memory, a long queue of such demands is maintained. With the queue organized to reduce drum latency, a large fraction of the main memory's throughput is utilized. In fact, the main-memory throughput is roughly proportional to the number of active CE's established in the high-speed storage up to a certain large number of CE's. For example, where the number of CE's is about ⅛ of the number of words per track serially located about a drum (i.e., in a memory cycle), a throughput of about 40 to 50% of the maximum effective throughput is achieved. Below this number of CE's, the throughput increases roughly proportionally with the increase in CE's; above this number, there is a continually smaller increase in efficiency with each increase in CE's.

Quantitative estimates of throughput can be made on the following basis. Although the typical operand is only 1 word long, the 8 word instruction fetches for IB102 raise the average drum transfer (DT) to about 3 useful words per DT. Each DT wastes about 1 drum word time (DWT) for switching the drum's magnetic heads. The prorated share of DWT lost in filling the IB, both after its exhaustions and after jump instructions, reasonably amounts to about 0.5 DWT/DT. Thus each DT withdraws about 4.5 DWT (i.e., 3.0+1.0+0.5) from possible access to the drum by other CE's. Since each CE can generate 2 DT's/rev., 128 CE's working at full load with a fast processor can reasonably attempt about 240 DT's/rev. Since some attempts will conflict with others by overlapping in AP values therewith, a smaller number will be successful. The first DT's considered have 100% chance of success. The following DT's have a lesser chance of success. But since only 228 DT/rev. are possible (i.e., 1024/4.5=228), one can see on a simplistical basis that the 229th one has 0% change, and the overall average chance of success of 228 DT's is about 50%. Thus 114 DT's/rev. on the average can be completed.

The above calculation scheme is overly conservative because the overlap of several attempted DT's on the same drum AP withdraws fewer DWT from use than figured. By calculus it can be shown that 240 attempts will on the average complete about 148 DT's/rev. With 3 useful words per DT the drum's throughput for all 128 CE's is approximately 444 useful words per rev. In short, a small system of 128 CE's embodying this invention can achieve a useful throughput of about 42% (i.e., 444/1024) of the drum's transfer rate, despite head switching time, conflicts for time slots, and losses associated with IB. As the number of CE's is increased, the useful throughput percentage also increases up to some practical limit.

In this multi-computer system, the arithmetic speed of the processor is relatively high (a plurality of processors may be shared by the CE's where appropriate), so that the latency of the restricted-access memory tends to be the limiting factor on overall throughput. The number of unit records (i.e., words) per track is high compared to the number of CE's. Under these conditions, an overall system throughput is attained with this invention that is at least comparable to that of conventional time-sharing systems using cyclic memories such as drums for storing programming jobs when not under active processing. But the amount of expensive random-access memory required for the system of the present invention can be designed to be substantially less than that required for comparable time-sharing systems.

Each computing entity is compact and inexpensive; for example, at about 3 cents per bit for the magnetic-core memory used for the CE registers, the manufacturing cost of the dedicated registers of each CE is about $70; some 4,000 words of drum dedicated to each CE, at about 0.1 cent per bit, cost about $160, and the relatively expensive CECW cell 171 for each CE in CAM costs about $50 (at the relatively high rate of about $1 per bit). At these unit costs, it is very practical to have dozens and hundreds of CE's in an integrated ssytem, and their aggregate demands for access to the drum will tend to keep this mass memory usefully busy as the main memory of the system. Since each CE is so low in cost (e.g., a monthly rental is aften calculated as 10% of manufacturing cost, or about $28 per month for the dedicated portions of such a CE) and the economic waste in an idle CE is minimal, a system is preferably designed with a maximum number of CE's, despite high expectation of idleness of some CE's at various times.

VARIATIONS OF RANDOM—ACCESS MEMORY

Any CE may be assigned additional areas of random-access memory 20 to supplement the dedicated CE registers thereof. Thereby, the job of a particular CE may be handled at higher speed since larger pieces of its program and its operands are processed with fewer drum transfers (which tend to lose some time in drum latency and processor coupling and uncoupling).

The assignment of additional magnetic core storage to a CE, and the addition of normal core capabilities (hereinater called NCOR) to the basic CE does not take away any capability therof; it only adds some optional modes. Although various areas of core that have specialized uses (e.g., the CE's) are often better left unchanged, all of the rest of the high-speed random-access memory (i.e., NCOR) is potentially available for both instructions and operands. As described above, the half of core that is called Buffer Store is very easily used for normal core (NCOR) because multi-word drum-to-buffer and buffer-to-drum transfers are easily made by the PUSH and PULL instructions. The latter are normally used for loading and unloading the Input-Output Buffers that support high speed peripherals.

The multi-computer approach (i.e., the 128 CE's) is maintained to allow easy efficient reversion to the pure CE mode with its emphasis on an efficient handling of drum transfers. Access to the CE's general purpose registers is facilitated and these are the preferred means to reach the drum for operands. NCOR is separately and independently available for storing operands and for the instruction stream.

Hardware protection against erroneous excursions outside Supervisor-specified limits are incorporated through core operand acess register (COAR) and core program counter and limiter (CPCL). These registers are kept in the protected area of the CE. Preferably CE REG #55 is assigned to COAR and REG #54 to CPCL and withdrawn permanently from the instruction buffer.

Interrupts normally occur only after drum transfer has been completed, i.e., either for an operand or for an IB load of instructions. Interrupt programs can themselves use NCOR.

The system may be implemented with the following modifications to handle NCOR: The core instruction mode (CIM) is controlled by the presence of the CIM tag (CIMT) in PSW 110 and in the corresponding flip-flop in the central processor 22. CIMT is turned on by specific programmed jump instructions.

In the basic CE mode described above and hereinafter called drum instruction mode (DIM), the flow of instructions comes from the instruction buffer (IB) under the control of a short local program counter (LPC) and the instruction buffer location (IBL) which together form an effective program counter. Where the CE is operating in CIM, a conventional program counter in the processor becomes operative, and its contents are stored in CPCL of the CE whenever the CE is uncoupled from the CP. During CIM, CPCL is stored and restored whenever PSW is similarly handled. Thus circuitry controlled by CPCL obtains instructions and feeds them to the computer just as LPC and IB do. The format of the instructions handled does not change between CIM and DIM. CIM is entered by a particular class of jump instruction called "Core Jump," which sets CIMT; and when in CIM, the jumps between addresses within NCOR used the same Core Jump instructions. Also, the CE program jumps to DIM by a jump instruction; or, by turning off the CIM tag, the CE merely reverts to DIM, and prior values of LPC, IBL and IB thereafter supply the instruction stream.

The CPCL (e.g., in REG. #54) contains four fields: a single CIM bit which is set or reset by the Supervisor, depending on whether this mode is permitted or not for the particular CE; a CPC (core program counter) field of about 17 bits; and two 8-bit fields for lower (LCIL) and upper (UCIL) core instruction limits (controlled by the Supervisor). The CPC field counts to within a half word, and it defines a core address that is relative to the LCIL; the latter (as does the UCIL) defines the 8 most-significant bits of a 17-bit address, and CPC is added to LCIL to determine the actual address. Alternatively, the system may be so constructed that CPC defines an absolute core address.

Every core jump instruction changes the CPC part but checks the new value against LCIL and UCIL. If off limits, then a shut-down interrupt is forced. The drum instruction mode is fairly efficent for chunks of coding with few effective jumps. IB removes most of the latency is memory access involved with instructions. Therefore CIM appears rather marginal when the cost-performance ratio of computer calaculations is the dominant concern. However, when the cost of allocated core is minor compared to real time constraints and penalities imposed by the otuside world, CIM can be most useful.

The core operand mode (COM) is controlled and maintained by the presence of the COM tag (COMT) in the PSW 110 and in the corresponding flip-flop in the processor 22. COMT is turned on and off by specific programmed instructions. COM is contrasted with the pure drum operand mode (DOM), which is the basic mode of the system described above. As has been explained, the DOM format is basically an 18-bit instruction referring to two operands, both in CE registers. That is, the COM format uses the basic instruction format of a 6-bit operation code and a 6-bit CE register address (i.e., Register-S) in one half-word; and, in the following half-word, a 17-bit address for an NCOR word for the other operand. Once the COMT is turned on (i.e., set to 1), the instructions are always interpreted on a 36-bit basis housed in successive half-words. Either IB or NCOR may be supplying the instructions of COM.

Drum transfer instructions are permitted in COM. The generation of the CECW and the recording of PSW is practically identical as in DOM. As in DOM the drum transfer can access the general purpose registers in the CE or the buffer area in core, but not the NCOR in its full generality. The CE is uncoupled from the processor while its drum transfer command is held in CAM and eventually executed. At the time of recoupling the CE to the processor, there is a natural opportunity for program interruptions to be easily handled. Alternatively, serious interrupts can be forced into the processor despite the lack of a DT. When this CE is again coupled to the processor, the presence of COMT will also cause the COAR to be read into CP for continued checking purposes. Every subsequent NCOR address is checked within the processor without additional accesses to CE REG #55 for COAR contents. If the instruction exceeds the bounds of operations permitted, then a shut down interrupt is initiated.

The COAR (REG. #55) contains four fields which are controlled by the Supervisor: a single COM bit which is set or reset depending on whether this mode is permitted or not for the particular CE; a 1-bit ROC (read-only-core) field, which, when set, limits the use of NCOR to read-only so as to protect it from modification. In addition, two 17-bit fields for lower (LCOL) and upper (UCOL) core-operand-limits or address ranges of NCOR that are permitted to be accessed for operands, are provided. Either absolute or relative forms of NCOR address may be employed in the system consistent with the system used for CPC, as noted above. The absolute address form is preferred where the allocation of core is relatively permanent in the system, for example, where a plurality of CE's may require access to the same area of NCOR. The relative form is preferable for a CE system in which the CE's operate independently in different core areas.

Alternatively, core operand instructions may be utilized in the format and instruction stream that is basically and usually DOM. That is, certain CE registers such as PSW, IBL, CPCL and COAR are never accessed by the user's program by the CE REG#; the particular 6-bit codes for these few REG# can therefore be given arbitrary, "ad hoc," meanings by circuits that test Register-S and Register-T contents of the basic 18-bit DIM instruction format. For example, since PSW is in REG #63, "REG #63" may be given the ad hoc meaning of "use of trailer half-word as an NCOR address." Similarly, "REG #56" (i.e., IBL) may be used to mean "use the two trailer half-words as literal data without needing a register address, etc." Such ad hoc uses are useful for both operands of an instruction. They may also be used in both unconditional and conditional Jump and Core Jump instructions. Thus both COM and CIM may be achieved in effect, but without the need for the special tags COMT and CIMT in PSW and the special instructions therefor. This scheme is easy for programmers to learn and remember and may extend the usefulness of the somewhat limited 64-member (6-bit) instruction set appreciably.

By the addition of variable amounts of NCOR to each CE that may require it, the overall system installation and each individual user can flexibly augment the speed and responsiveness of the system to the particular demands of each CE. Some problems have solution algorithms that are "multi-thread" and can be worked in parallel; these problems are quickly handled by a gang of CE's as described below. In contrast, there exist problems and algorithms that are "single-thread" and require sequential handling and which are not speeded by gangs; for such uses NCOR is invaluable.

Each CE is formed of two parts. The first part includes registers which are fixed in both location and number (e.g., the 64 registers of each CE in FIG. 2). The second part is NCOR and may be considered to be a variable number of variably located registers. Moreover, all of the CE's can be variable in size and location. For this purpose, the CECW contains not only the CE# field, but also an additional field which has the complete base address (e.g., 16 bits) in high-speed random-access memory for that CE. The base register 130 is correspondingly longer and it affects addresses by actual addition (of 16 bits) rather than by concatenation (of 8 bits). Although the size of CAM limits the maximum number of CE's, it would thus be feasible to construct this system with a variable number of CE's in variable locations each with a variable number of registers. However, the simpler system construction of a fixed number of CE registers at fixed locations is preferred.

INTERCOMMUNICATION—INTERLOCKS

In the integrated multi-computer (and multi-user) system of this invention, a plurality of users can access and modify a common drum file asynchronously. Under such circumstances, a single item might be subjected to two or more updatings simultaneously, i.e., by overlapping or interleaved sequences of read, modify, and write operations. Such an occurrence can cause unacceptable errors in the final state of the file item and are prevented by coordinating the CE's via interlocks. The interlocks are implemented by a test-and-set-or-wait instruction in a user's program; which tests to determine if an item or a section of a file is accessible, and if it is, sets up an interlock as against any other CE gaining access thereto; and which forces its own CE into a long period of idleness if some other CE has already set up a suitable interlock. Thereby, undesired interactions of the CE's in the overall system are controlled and prevented.

The test-and-set-or-wait (TSW) instruction uses the standard 18-bit format. The Register-S is not used and Register-T has the CE REG# of a word containing the interlock name (IN) which is merely a suitable arbitrary pattern of bits (with some combination of specified bits identifying the interlock character of the name) in a standard location in the register word. Any row or cell 260 of ECAM 174 may be used to store an interlock word (IN); each such row also includes flag bits 262 that identify the full or empty state of that row. The TSW instruction causes a search to be made in ECAM 174 (via its search logic 198) in standard bit positions for equality or non-equality with IN. The presence of an IN word in ECAM is itself a functional part of an interlock mechanism that responds to the same pattern of IN bits supplied by a program from any of the CE's. This interlock mechanism includes DBLR registers of each CE, which (as described above) compel the use of certain supportive instructions for any particular data file. These supportive instructions are constructed to include TSW instructions in connnection with the file system, and are outside of the user's control. Thereby a complete and effective interlock mechanism is ensured.

The execution in the processor 22 of a CE's TSW instruction energizes the CAM search control 190, via programmed search instruction (PSI) lines 264, subject to a drum-transfer search already in progress. The search control 190 then initiates the sending of the interlock name IN to the search register 182 via bus 90 and to the CAM input-output register 92. The search control 190 directs the performance in ECAM 174 of a search for IN, and any words therein which match this search argument in the search register 182 will turn on their corresponding RFF 186. There are two classes of possibilities for the final states of the RFF's in ECAM search logic 198; none are on; one is turned on; these two are distinguished by the presence and absence, respectively, of a null signal on line 202 from resolver 200 to processor 22.

If no RFF is on, then no prior interlock having the desired name IN exists, and the search control 190 directs the transfer of the contents of CAM input-output register 92 into any one empty cell 260 in ECAM 174. Thereby, the interlock mechanism for the particular IN is set against other CE's. The finding of a suitable empty ECAM cell 260 is directed by the search control; i.e., a one-bit search for an empty flag 262 is initiated, and the resolver 200 selects a single cell in ECAM, and directs the writing therein of CAM register 92. Thereby, the TSW instruction in processor 22 is completed, and the latter proceeds in normal fashion to the next instruction, which may be an operand drum transfer for which the interlock was established.

If one ECAM RFF 186 is on, then a prior interlock of this specific name IN exists. The CE is forced into a temporarily idle condition by the processor 22, using the normal mechanism of sharing the processor among the CE's. That is, the absence of a null signal on line 202 directs the control word generator 118 to create a slightly different version of the CECW. The DWF 144 is set to zero (and the CECW automatically sets to zero the PWF 172' for the associated CE), and one of the flags 164, especially the interlock idle flag (IFF), is set to one. With the DWF and PWF fields 144' and 172' both zero, this CE remains unselected by either type of search and thus idles indefinitely. Also, the LPC 134 was not incremented in the normal fashion, and thus the interlock instruction test-and-set-or-wait will be executed again at a future time, and is the first instruction to be executed when the CE is again coupled to the processor. Thus we see how the presence of a prior interlock from any CE forces a later CE into indefinite idleness.

The temporarily idled CE's are made active again in the following manner. On a periodic basis, and subject to delay by previously set-up searches, the search control 190 directs a search on IFF 164', which turns on the RFF 186 of the corresponding words in CAM. At each of these locations, the set RFF's cause a "1" to be written into the associated fields 172' and a "0" into IFF field 164'. Removal of an interlock from ECAM 174 is accomplished by a specific programmed erase-ECAM instruction that directs control 190 to search ECAM for the interlock name IN, and, when found, to overwrite that location with null information and, in particular, the empty flag 262 is reset to the empty cell state.

INTERCOMMUNICATION—GANG CONTROL

If one computer entity has inadequate speed, the programmer can request the system for a gang of several CE's working cooperatively together. Each member of such a gang acts concurrently and independently of the others most of the time. Control between the CE's is exercised by Fork and Join instructions. "Fork" releases the inhibition of a Gang Delay Flag (GDF) against using the central processor on each CE of the gang, and allows each to follow its own path of instructions. This path of programmed instructions may be the same as or different from others of the gang. "Join" forces the CE executing it to wait for the last CE in the gang. Both Fork and Join instructions are implemented by searching in CAM 70 and/or ECAM 174 for the gang name, and then manipulating the GDF flag field 162' in said individual CECW appropriately. Thus a gang is efficiently controlled once its members have been selected by the Supervisor.

The above scheme is implemented in the following way. Consider a gang of separate CE's at a time when some members are active. The CAM cells of the idle members of the gang have PWF 172' equal to zero, DWF 144' equal to zero, and GDF 162' equal to 1. With DWF and PWF both zero, such CECW's 171 remain unselected by corresponding searches, and thus their CE's remain idle indefinitely. Each active CE 42, except the last one, turns itself off, or inactive, by a programmed instruction named "Join" which is described below. The effect of Join is that the control word generator 118 creates a CECW cell in register 142, with the programmer-specified gang name written into a single field occupying fields HN 154 and AP 156, and with the flags as specified above, and places it into CAM 70 at the proper CE cell 171 in the usual fashion.

A gang, or any portion thereof, is reactivated when a programmed Fork instruction is executed, identifies a register 100 containing the Gang Name and energizes search control 190 via PSI 264. Subject to delay for prior searches, the search control then directs the transfer of the programmer-specified Gang Name from the register 100 via bus 90 to the search register 182 to establish the Gang Name as the search argument together with a "1" in the search-bit position corresponding to GDF field 162'. The search is performed in CAM 70 on fields HN, AP and GDF (154', 156' and 162'). All CECW's 171 which respond have their PWF 172' set to "1" and thus the gang is reactivated; all the members thereof are enabled to continue in the execution of their separate or common programs.

The instruction "join" can be descriptively named "wait-for-the-last-active-CE", and it identifies a register 100 containing the Gang Name. Each CE in a gang will eventually execute a programmed Join instruction to determine whether it is the last active CE in the gang. Using the PSI lines 264 for programmed search instructions, the Join instruction directs control 190 to search the cells 260 of ECAM 174 for a Gang Control Word having a Gang Name identical to the program-specified one in register 100 (i.e., the Gang Name is the search argument in register 182). When this word in ECAM 174 is found, it is read out and transferred via register 92 and bus 98 to the central processor 22, where a special count field 266 thereof is decremented by 1 and tested. If this count-of-members-still-active field is at its predetermined lower limit (e.g., zero), then this computer entity CE is thel ast active one. If the count has not reached its limit, the gang-control word modified with the decremented count field 266 is rewritten back into its cell in ECAM 174 and this particular CE 42 is made idle by the mechanisms described above using the gang delay flag and by setting the Gang Name in the HN and AP fields 154' and 156' for that CE. If this is the last active CE, the Join instruction is completed by a conditional jump to a program-specified location, where the programmer may have written special coding to organize the gang for its next job of parallel computations. For example, it erases the present gang control word in cell 260 (e.g., by means of the erase-ECAM instruction noted above) and composes and writes a new one using a variation of erase-ECAM. Ultimately, the program for the last-active CE calls for a Fork instruction that allows the gang to begin parallel and simultaneous computations again. The Gang Name words may be retained in specified registers of each CE, which are accessible to the user on a read-only basis, whereby one user may not interfere improperly with the gang control of other CE's.

Thus, ECAM and CAM provide a mechanism whereby a plurality of independent CE's can communicate, each with the others, can be "joined" for cooperative processing, can operate with common data files on a coordinated, non-interfering (i.e., interlocked) basis, and can be separated on a completely independent basis. Storage areas in both drum and NCOR, as described above, can be shared among the CE's whereby one CE can effectively communicate with specified others. ECAM, as described for interlock and gang control, affords a mechanism or bulletin-board whereby the intercommunication can be effectively directed. Various other types of intercommunication and related controls can be obtained in related ways. For example, akin to the Join instruction, ECAM can also be used as a "bulletin board" among CE's carrying individual messages to certain specified CE's or on a "to-whom-it-may-concern" basis. Each such message found by a search instruction may be read from ECAM either destructively or non-destructively, or may be used, when found, to initiate a programmed jump to a specified address.

Thus, by means of this invention, an intercommunication system is provided for a plurality of "computer units," each of which is formed of a set of addressable registers with the set itself having an address, and each of which maintains the status of the stored program being performed thereby. All of the computer units have access to a common mass memory, with the portions to be accessed established in registers (e.g., DBLR) individually associated with the computer unit, whereby each computer unit may be excluded from specified portions of the mass memory and may obtain access in common with other portions.

A content addressed memory has an individual section associated with each computer unit. Control words are generated by a processor (and stored in that memory) in accordance with instructions established in the program of each computer unit. Thereby, each computer unit can control the setting or resetting of flags in the content addressed memory section of any other computer unit, which flags are searched in connection with various control operations of this memory. The latter is also used in connection with all mass-memory transfers and all assignments of the processor to a particular computer unit. Thus, by the settings of the flags, one computer unit may delay or enable the going forward of another computer unit. This arrangement establishes a basic intercommunication control and signaling mechanism. In addition, with the ability to read and write from common portions of the mass memory, more elaborate intercommunications are achieved.

CONSOLE CONTROL

In one form of the system of FIG. 1, each of a plurality of the input-output terminals 24, 26, 28 may be operator consoles, such as the electric typewriters commonly used with computers. Where direct-wire connections to the input-output channels 30 are used, these may include a plurality of parallel lines to carry, in parallel, the combinatorial bits forming successive characters. The channels 30 (by means of hardware logic, or equivalent software controls) control the transfer of character or word signal combinations originating at a certain terminal directly to specified registers of the particular CE individually associated with that terminal. Similarly, the channels 30 control such transfers from the CE's to the associated channels. Suitable control systems for this purpose are well known in the art, and one such system is described in the above-cited report at pages 43–45. For the purpose of controlling such transfers, a control word used by channel 30 is stored in a specific CE register accessible to the user-programmer (e.g., REG #37). This register contains a field defining whether such transfers are permitted; a field defining whether the transfer is input or output; fields defining the starting and ending REG# for holding the words to be transferred; and a word and character-count field used by channel 30 together with the CE# for generating the proper register address for the transfer and for manipulating data fields to insert characters in the proper field position of the proper word.

In operation, the operator sitting at the keyboard of a console types a message directed to the associated CE. This message may take various forms known in the art, e.g., merely raw data in continuous strings of characters and words. The channel 30 transfers the message to the specified registers, and when a predetermined number of such words have been transferred the channel generates an interrupt-request signal that sets an "explore-interrupt" tag (XIT) in a certain field of the PSW register 110. The interrupt-request may also be generated by a special keyboard operation such as "carriage-return." The next time the CE is coupled to the processor 22, the contents of the PSW register are transferred to the processor and the XIT flag sets a flip-flop therein. This action automatically initiates a special routine, except where a "non-interruptible" tag (set-table in PSW by the programmer) is set, or some other tag (e.g., one that is set in PSW when the CE program goes into the interrupted state) is set. The special routine (e.g., an interrupt, an executive or other type) is initiated by the generation of an instruction fetch to fill the IB 102 starting with a drum address specified by the contents of CE REG #38 (an interrupt-entry register). The fetched routine proceeds to interrupt and handle the message in an appropriate manner known in the art. Upon completion of this routine, an exit therefrom may be performed by jumping to the drum address contained in REG #39 (an interrupt-exit register). This exit address was set up by the hardware and/or routine during the course of the interrupt; the entry and exit addresses may also be NCOR addresses where the CE is operating in such a mode. The usual provisions are provided in the interrupt-control hardware: for storing the program counter (i.e., IBL and LPC may form the exit address in REG #39) the PSW of the pre-interrupt status is stored in a buffer section of the PSW register 110 (or any other suitable place); and for setting a tag to isolate the CE from further interrupts until the current one is handled and completed. The contents of IB are abandoned since REG #39 supplies the address of fresh copy. A similar process initiated by the program is performed to exit from the interrupt state, reset tags required, and jump to a normal state. When the interrupt routine was initiated, XIT was reset, to receive another possible interrupt-signal during the interrupt routine. When an interrupt request comes in to set XIT in a CE which is then coupled to the processor, the corresponding processor flip-flop is set, and at an appropriate time in the current processor cycle or at the end thereof (and subject to any non-interrupt tags) the interrupt operation described is performed.

Associated with such consoles are two simple kinds of interruption called STOP and GO. Separate switches or keyboard keys will generate these signals and they will appropriately affect their CE by hardware without involving the Supervisor or any other program. Both the STOP signal and a programmed STOP instruction set a stop tag (STPT) in a certain field in PSW. Unless inhibited by other non-interruptible tags, STPT is recognized when the CE is next coupled to the processor 22 and the CE is then made idle by setting IDLF in one of the flag fields 164' of its own CAM cell 171 by generating an appropriate CECW.

The idle flag IDLF in every CECW cell 171 in CAM 170 is used to enable a CE to be idle without continually wasting processor time and drum-access time. This purpose is implemented by modifying the processor-wanted search to require that IDLF be reset as well as that PWF be set. Thus when IDLF is set, that CE will not be coupled to the processor.

IDLF is set through a CECW generated by a stop instruction, as well as by the STOP signal from the console, if allowed by other tags in PSW. IDLF is reset by the GO signal from the console; that is, GO develops a reset-IDLF signal in the channel 30, which is supplied via control lines 270 to the input-output register 92 of CAM together with the CE#, and the latter is supplied to the decoder 196 for gating the reset signal into the flag field 164' of the proper cell. In a similar fashion, each interrupt-request signal also generates a reset-IDLF, since the interrupt calls for action by the CE.

One CE can attempt an interruption in any other CE by a programmed instruction. The instruction that implements this inter-CE interrupt is mainly a minor variation of the well-known add-to-memory type of instruction; i.e., the address of the operand is limited to the PSW (REG #63) in the specified CE and only the XIT bit thereof. This interrupt instruction merely modifies that XIT bit to set that tag; in addition, the instruction resets IDLF in the CAM flag field 164' of the CE to be interrupted (e.g., in the manner similar to the resetting via control lines 270). Since the CE to be interrupted can ignore interrupts by means of a non-interrupt tag in PSW, and has complete control over its porgrams that handle interrupts, there is no significant loss of control in permitting CE's to "ring the doorbell" of other CE's. This inter-CE function allows some CE's to specialize in the use of files and others to specialize in watching the console and responding directly to the user. This separation of functions can produce more work per hour using simpler programs and the economic waste involved in a dedicated but little used CE is quite small.

The user at his console can operate almost independently of the Supervisor. Once the Supervisor has granted him access to extended drum memory and to certain drum files via the CE's DBLR's, the user can ignore the Supervisor and not use any part of it, nor be dependent on its availability and proper functioning. Thus, the CE user may operate independently of the Supervisor once he has been assigned the necessary drum files.

The user has a "hands-on" control over his CE if he writes his program accordingly. He has switch controls on his console, or on his keyboard, that can stop his CE, start it, or force an interrupt therein. With these signals and with suitable implementing subroutines, the user-programmer can control his CE at almost any level of intervention. For example, his interrupt routine might cause the program-counter value (from CE REG #39) and various general purpose registers to be printed, and the routine would wait for his key-stroked demands to read or change any register, or drum location, or jump to any address (available to his CE). Such a hands-on control is achieved without the involvement of a complicated supervisory program. That is, each console can interrupt its own CE at any time independently of any other, and the processing of the interrupts is equal in speed to that of any other task performed by a CE.

The above-described invention in an integrated multicomputer system enables a large number of independent users to perform data processing simultaneously. Each user employs a computer entity which, with the processor and its associated drum files, functions as a complete computer. An intermediary supervisory program is generally required where files (or special equipment) are available in common to several users; otherwise a Supervisor is not ordinarily required for complete computer service. The expensive equipment components of this system (e.g., the drum and processor) are utilized with high efficiency. A relatively small amount of expensive random-access memory is required for each computer unit, and the pro rata share of each CE in the total amount of such memory is also small. Users have the benefit of a far larger memory than is economical with random-access devices while maintaining high system throughput therein. Programs can be accessed in common by many users without duplication. A supervisory program, aided by hardware, can be used to protect common files and common peripherals from errors by individual users, but independent programs can be directed and controlled by their console without such a Supervisor when desired. This allowable separation achieves easier "debugging" of both the Supervisor and the individual jobs. Batch processing is accommodated in one set of computer entities, while another set may perform real-time processing. Batch processing can be greatly accelerated by the use of gangs to the extent that the user's algorithms can take advantage of computations in parallel. Programs are easier to write and to debug because of the large memory and the simplicity of the programmed use thereof. Specifically, there is no paging, no dynamic address modification, no dynamic relocation, no optimization of page content in the context of contemporaneous pages (at execution time), and no minimum latency coding. Quickly tested and highly specific interlocks allow independent access to common files and facilities with no logical errors and with only small average delays.

As discussed above, system throughput is often bettered by increasing the number of CE's (or, in conventional terms, increasing the number of jobs resident in magnetic-core random-access memory) even if the amount of available core memory per job must be cut proportionally. That is, in terms of overall efficiency and throughput, an optimum division is sought of a certain amount of high-speed random-access memory into a certain number of computer entities, each made up of a certain number of word registers or unit records. The optimum division is generally that of a larger number of computer entities and a smaller number of registers. As indicated above, within ranges of computer units greater than about 50, the number of such computer units is about equal to or greater than the number of word registers in each computer unit.

In addition to the embodiment of the invention and the various modifications thereof described above, other embodiments and modifications will be apparent to those skilled in the art from the above description of illustrative forms of this invention. The appended claims are intended to cover such modifications as are encompassed by the scope and spirit of this invention.

What is claimed is:

1. An integrated multi-computer system comprising:

a mass restricted-access memory for storing combinations of data signals and combinations of instruction signals of an internally stored variable program in certain locations including means for gaining access to said locations in a sequence from one memory location to another;

a plurality of independent computer units each including a separate set of a plurality of random-access addressable registers for receiving and storing said data and instruction signal combinations from said memory, said computer units including at least one common central processor and having means for coupling said processor for individual operation with each of said register sets for performing data processing operations in accordance with said instruction-signal combinations thereof on the associated data-signal combinations and for terminating said coupling, and means for generating signal commands including commands for transfers of said signal combinations between said computer units and said mass memory;

and control means for receiving from said computer units said transfer commands, for storing said transfer commands, and for directing the operation of said memory access means to perform said transfer operations in accordance with said transfer commands and in an order corresponding to that of the storage locations in said memory sequence;

whereby over each memory sequence said memory transfers for a large number of said computer units may be performed to afford a high overall efficiency in access to said memory.

2. An integrated multi-computer system as recited in claim 1, wherein each of said computer units has means including certain ones of the registers thereof for retaining signal combinations representative of an operational state of the associated program in all periods between coupling with said processor.

3. An integrated multi-computer system as recited in claim 2, wherein said retaining means further includes means for transferring signal combinations representative of an operational state of said processor to one of said certain registers of the associated computer unit when terminating coupling of the processor thereto, and from said one register to said processor when initiating said processor coupling.

4. An integrated multi-computer system as recited in claim 2, wherein said retaining means of each of said computing units further includes a predetermined plurality of said certain registers for storing a plurality of said instruction-signal combinations therein.

5. An integrated multi-computer system as recited in claim 4, wherein each of said computer units includes means for restricting transfers of said instruction signals to said certain registers therefor.

6. An integrated multi-computer system as recited in claim 4, wherein said retaining means of each of said computer units includes another predetermined plurality of said certain registers for storing a plurality of said data-signal combinations therein.

7. An integrated multi-computer system as recited in claim 4, wherein each of said computing units includes means for specifying successive ones of said predetermined registers for instruction-signal combinations to be performed by said processor.

8. An integrated multi-computer system as recited in claim 7, wherein each of said computing units includes means for initiating operation of said command generating means to obtain another plurality of said instruction-signal combinations upon completion of the performance of any plurality thereof stored in said predetermined registers.

9. An integrated multi-computer system as recited in claim 8, wherein said retaining means includes another one of said certain registers for storing the address in said mass memory of the instruction-signal combinations next succeeding the plurality thereof stored in said predetermined registers.

10. An integrated multi-computer system as recited in claim 4, wherein each of said computing units includes means for initiating operation of said command generating means in response to an instruction-signal combination representative of a jump instruction.

11. An integrated multi-computer system as recited in claim 1, wherein each of said computer units includes means for restricting transfers of data signal combinations to certain ones of the registers thereof.

12. An integrated multi-computer system as recited in claim 1, wherein each of said computer units includes means for preventing access to certain ones of the computer unit registers for writing therein under direction of said instruction-signal combinations.

13. An integrated multi-computer system as recited in claim 1, wherein said control means includes means for successively initiating coupling of said processor to said computer units.

14. An integrated multi-computer system as recited in claim 13, wherein said processor-coupling initiating means includes means for supplying to said central processor an address individually associated with one of said register sets.

15. An integrated multi-computer system as recited in claim 14, wherein said processor-coupling means includes means for registering base addresses individually associated with said register sets.

16. An integrated multi-computer system as recited in claim 13, wherein said processor includes means for generating a control command upon completing the processing for each of said computer units; and said processor-coupling initiating means of said control means includes means responsive to said control command for directing said processor for coupling to the next computer unit to be processed thereby.

17. An integrated multi-computer system as recited in claim 16, wherein said processor includes means for terminating the processing with a computer unit upon generating a transfer command; and said processor-coupling initiating means includes means responsive to a transfer command for directing said processor for coupling to the next computer unit to be processed thereby.

18. An integrated multi-computer system as recited in claim 17, wherein said processor-coupling initiating means includes means for registering identifications of those of said computer units for which transfer operations have been completed, and means for searching among said registering means.

19. An integrated multi-computer system as recited in claim 1, wherein said mass memory includes a cyclic memory having means for reading and writing in successive parts thereof during each memory cycle; and said control means for directing memory transfers includes means operable during each memory cycle for scheduling said memory transfers in accordance with the order of the storage locations in said memory cycle and for controlling said reading and writing means to perform said transfers at the corresponding parts of said memory cycle.

20. An integrated multi-computer system as recited in claim 1, wherein the number of said computer units is equal to or greater than the number of unit records stored in the registers of each computer unit.

21. An integrated multi-computer system as recited in claim 1, wherein the number of said computer units is greater than the number of instruction-signal combinations stored in the registers of each computer unit.

22. An integrated multi-computer system as recited in claim 1, wherein separate portions of said mass memory are individually associated with said computer units; and further comprising means for preventing access by each of said computer units to said memory portions individually associated with others of said computer units.

23. An integrated multi-computer system as recited in claim 22, wherein each of said computer units includes means for restricting access by each of said computer units to certain portions of said mass memory.

24. An integrated multi-computer system as recited in claim 1, wherein a portion of said mass memory is associated in common with a plurality of said computer units; and further comprising means for controlling access by each of said associated computer units to said commonly associated memory portion.

25. An integrated multi-computer system as recited in claim 24, wherein said signal command generating means includes means for generating access interlocking commands; said access controlling means includes means for storing said access interlocking commands and for searching the stored commands; and said interlocking command generating means includes means for initiating searches of said stored commands.

26. An integrated multi-computer system as recited in claim 1, wherein said control means includes a content-addressed memory for storing said transfer commands and having means for repeatedly searching the stored commands in accordance with the storage location sequence of said mass memory.

27. An integrated multi-computer system as recited in claim 1, wherein said generated signal commands of each of said computer units include commands for controlling memory-transfer and processor-coupling operations of others of said computer units; and said control means includes means for directing said memory-transfer and processor-coupling operations in accordance with said other computer unit commands, whereby the performance of a stored program via one of said computer units is controllable via that of another thereof.

28. An integrated multi-computer system as recited in claim 1, and further comprising a plurality of input terminals for supplying message signals, and means for coupling each of said terminals to a different one of said computer units.

29. An integrated multi-computer system as recited in claim 28, wherein the register set of each of said computer units includes means for storing said message signals supplied from the associated terminal, means for registering an interrupt control signal upon receiving said message signals, and means for registering a memory address of instruction-signal combinations for processing said message signals; whereby a terminal may be used to interrupt a job being performed by a computer unit.

30. A computer system for controlling a multiplicity of read-write, generally concurrent accesses to areas of a common memory comprising the steps of:
- generating and storing in a group interlock words in connection with operations of accessing certain memory areas, each of said words separately identifying a particular memory area and its status of use;
- searching, as a preliminary part of each of said access operations, said group of interlock words for such a word associated with the memory area being accessed; and,
- where said searching finds the presence of the associated word, terminating said access operation, and where said searching finds the absence of said associated word performing said step of storing in said group said associated word and also proceeding with said access operation.

31. A computer system as recited in claim 30 wherein said step of searching for a particular associated word is performed without interruption for the entire group of interlock words to determine the absence of said associated word.

32. A computer system as recited in claim 31 wherein each of said interlock words includes an arbitrary combination of binary signals, whereby said interlock words can be generated through a computer program without limitation to specific memory addresses.

33. A computer system as recited in claim 30 wherein said step of storing in a group employs an associative memory and said steps of searching and locating are performed by means of said associative memory.

34. In a computer system, the method of controlling a plurality of generally concurrent accesses to common facilities of the system comprising the steps of:
- generating and storing in a group interlock words in connection with operations of accessing certain of said facilities, each of said words separately identifying a particular facility and its status of use;
- searching, as a preliminary part of each of said access operations, said group of interlock words for such a word associated with the facility being accessed; and,
- where said searching finds the presence of the associated word, terminating said access operation, and, where said searching finds the absence of said associated word, performing said step of storing in said group said associated word and also proceeding with said access operation.

35. In a computer system, the method as recited in claim 34, and wherein said access operations for said steps of generating, storing and searching are to areas of a common memory for the purpose of reading and modifying common files.

36. In a computer system, the method as recited in claim 35 wherein said computer system operates with a plurality of computer units:
- said method further comprises operating said computer units to perform separate parts of a common job;
- whereby said job parts can be performed on a non-interfering basis.

37. In a computer system having a plurality of computer units, the method of intercommunication among a plurality of said computer units, said method being performed in connection with the operation of each of said computer units and comprising the steps of:
- generating and storing in a group signal words for intercommunication among computer units;
- searching as a part of an intercommunication operation said group of intercommunication words for the state of an intercommunication word associated with a particular intercommunication; and, where said searching finds one or another intercommunication word state, performing respectively one or another of different ones of said computer unit operations.

38. In a computer system, the method as recited in claim 37 wherein the word states searched by said searching step are the presence and absence of said associated intercommunication word.

39. In a computer system, the method as recited in claim 38 wherein said performing step includes the step of storing in said group said associated word where said searching finds the absence thereof.

40. In a computer system, the method as recited in claim 39 wherein said performing step further includes proceeding with a sequence of operations of a computer unit where said searching finds the absence of said associated word.

41. In a computer system, the method as recited in claim 38 wherein said performing step includes halting the sequence of operations of a computer unit where said searching finds the presence of said associated word.

42. In a computer system, the method as recited in claim 38 wherein said performing step includes proceeding with one of alternative sequences of operations of a computer unit where said searching finds the presence of said associated word.

43. In a computer system, the method as recited in claim 37 wherein the word state searched by said searching step is a count state related to said associated intercommunication word, and said searching step includes determining the relative size of said count and another number.

44. In a computer system, the method as recited in claim 43 wherein said performing step for one size relation of said count and number includes the step of modifying the count state of said associated intercommunication word.

45. In a computer system, the method as recited in claim 44 wherein said performing step for said one size relation further includes halting the operation of a computer unit.

46. In a computer system, the method as recited in claim 45 wherein said performing step for another size relation includes proceeding with a sequence of computer unit operations.

47. In a computer system, the method as recited in claim 43 wherein said performing step for one size relation of said count and number includes initiating an intercommunication with another computer unit.

48. In a computer system, the method as recited in claim 37 wherein said performing step includes initiating another intercommunication operation where said searching finds one of said intercommunication word states.

49. In a computer system, the method as recited in claim 37 wherein the performing step includes removing said intercommunication word from said group where said searching finds one of said intercommunication states.

50. In a multi-computer system for concurrently operating under control of a plurality of programs and employing different levels of memory, a first level of which is a high capacity low-speed access memory having an access latency time during which a specified memory location is being accessed and capable of providing access to other locations without substantial additional delay, and a second level of which is a high-speed access memory:

a plurality of computer entities having at least one common central processor and each including a plurality of registers of the second memory level for storing data and program instructions;

the method of operating the aforementioned apparatus under control of a computer program that direct said computer entities substantially concurrently, said method comprising the steps of: coupling said central processor to each of said computer entities to carry out the program instructions thereof until a transfer to or from the first memory level is called for, and establishing a store of signals identifying a plurality of said first level transfers;

performing each of said first level transfers for the associated computer entities and establishing a signal calling for recoupling of the computer entities to the processor;

and, upon decoupling of said processor from one computer entity, recoupling it to another computer entity in accordance with said recoupling signals;

whereby many small transfers of data and instructions can take place repeatedly during the performances of the program of each computer entity and the throughput of said multi-computer system is enhanced.

51. In a multi-computer system, the method as recited in claim 50 and further comprising the step of establishing a store of said recoupling signals.

References Cited

UNITED STATES PATENTS

| | | | |
|---|---|---|---|
| 3,251,041 | 5/1966 | Chu | 340—172.5 |
| 3,263,218 | 7/1966 | Anderson | 340—172.5 |
| 3,264,615 | 8/1966 | Case et al. | 340—172.5 |
| 3,469,239 | 9/1969 | Richmond et al. | 340—172.5 |

RAULFE B. ZACHE, Primary Examiner